US012470070B2

United States Patent
Xu et al.

(10) Patent No.: US 12,470,070 B2
(45) Date of Patent: Nov. 11, 2025

(54) PHOTOVOLTAIC SYSTEM AND POWER SUPPLY CURRENT CONTROL METHOD THEREOF

(71) Applicant: HUAWEI DIGITAL POWER TECHNOLOGIES CO., LTD., Shenzhen (CN)

(72) Inventors: Zhiwu Xu, Shenzhen (CN); Lin Li, Shanghai (CN); Huan Zhao, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 87 days.

(21) Appl. No.: 18/365,034

(22) Filed: Aug. 3, 2023

(65) Prior Publication Data

US 2023/0387693 A1    Nov. 30, 2023

Related U.S. Application Data

(63) Continuation of application No. PCT/CN2022/071222, filed on Jan. 11, 2022.

(30) Foreign Application Priority Data

Feb. 7, 2021    (CN) .......................... 202110169413.2

(51) Int. Cl.
*H02J 3/38*    (2006.01)
*H02S 40/32*    (2014.01)
(52) U.S. Cl.
CPC .............. *H02J 3/381* (2013.01); *H02S 40/32* (2014.12); *H02J 2300/24* (2020.01)
(58) Field of Classification Search
CPC .......... H02J 3/381; H02J 2300/24; H02J 1/12; H02S 40/32; Y02E 10/56
(Continued)

(56) References Cited

U.S. PATENT DOCUMENTS

| | | | | |
|---|---|---|---|---|
| 2015/0340869 | A1* | 11/2015 | Unru | H02M 7/42 307/82 |
| 2016/0285272 | A1* | 9/2016 | Arditi | H02J 3/38 |
| 2021/0036520 | A1* | 2/2021 | Yu | H02J 3/381 |

FOREIGN PATENT DOCUMENTS

| | | |
|---|---|---|
| CN | 101416368 A | 4/2009 |
| CN | 102281013 A | 12/2011 |

(Continued)

OTHER PUBLICATIONS

Microcontroller Compilation of Applied Technologies (Year: 2005).*
(Continued)

*Primary Examiner* — Elim Ortiz
(74) *Attorney, Agent, or Firm* — WOMBLE BOND DICKINSON (US) LLP

(57) ABSTRACT

This application provides a photovoltaic system and a power supply current control method thereof. The photovoltaic system includes a direct current bus and at least two power supply units connected in parallel to the direct current bus. The power supply current control method of a photovoltaic system includes: obtaining a current power supply state parameter of each of the at least two power supply units, determining a reference power supply current value of each power supply unit based on the current power supply state parameter of each power supply unit, and adjusting a current supply power of each power supply unit based on the reference power supply current value of each power supply unit. According to this application, appropriate load distribution between power supply units can be ensured, and applicability is high.

18 Claims, 5 Drawing Sheets

(58) Field of Classification Search
USPC .............. 307/18, 43, 52, 64, 82, 84; 290/44;
700/295, 287, 286, 291; 136/244;
320/101; 323/906
See application file for complete search history.

(56) References Cited

FOREIGN PATENT DOCUMENTS

| | | | |
|---|---|---|---|
| CN | 103580450 | A | 2/2014 |
| CN | 104113186 | A | 10/2014 |
| CN | 105229912 | A | 1/2016 |
| CN | 103516219 | B | 6/2017 |
| CN | 108258717 | A | 7/2018 |
| CN | 112751357 | A | 5/2021 |
| JP | H114544 | A | 1/1999 |
| JP | 2015043665 | A | 3/2015 |
| JP | 2017118721 | A | 6/2017 |
| JP | 2017184390 | A * | 10/2017 |
| WO | 2019228301 | A1 | 12/2019 |

OTHER PUBLICATIONS

He Liming, Microcontroller Compilation of Applied Technologies, Beijing University of Aeronautics and Astronautics Press, May 31, 2006, total 66 pages.

* cited by examiner

PHOTOVOLTAIC SYSTEM AND POWER SUPPLY CURRENT CONTROL METHOD THEREOF

CROSS-REFERENCE TO RELATED APPLICATIONS

This application is a continuation of International Application No. PCT/CN2022/071222, filed on Jan. 11, 2022, which claims priority to Chinese Patent Application No. 202110169413.2, filed on Feb. 7, 2021. The disclosures of the aforementioned applications are hereby incorporated by reference in their entireties.

TECHNICAL FIELD

This application relates to the field of photovoltaic power generation technologies, and in particular, relates to a photovoltaic system and a power supply current control method thereof.

BACKGROUND

In an application scenario of a small power supply device (for example, a communication power supply), a plurality of power supply devices are connected in parallel on a same bus, and a communication cable is connected between the power supply devices. The power supply devices (including a primary device and a secondary device) separately collect and obtain power supply currents of the power supply devices, and the secondary device uploads a power supply current of the secondary power supply device to the primary device. After receiving power supply currents of all secondary devices connected in parallel to the same bus in the system, the primary device calculates an average current reference value based on a power supply current of the primary device and the power supply currents of the secondary devices, and delivers the average current reference value to each secondary device. The primary device and each secondary device perform feedback adjustment on the power supply currents based on the average current reference value. Because parameters of the parallel power supply devices in this solution are different, appropriate load distribution between the parallel power supply devices cannot be ensured. Consequently, large currents are distributed on some power supply devices, and thermal stresses increase, finally affecting service lives of the power supply devices.

SUMMARY

This application provides a photovoltaic system and a power supply current control method thereof, to ensure appropriate load distribution between power supply units, and provides high applicability.

According to a first aspect, this application provides a photovoltaic system. The photovoltaic system includes a direct current bus, at least two power supply units connected in parallel to the direct current bus, and a DC/AC (Direct Current/Alternating Current) converter connected to the at least two power supply units through the direct current bus. Each of the at least two power supply units includes a DC/DC converter, and an input end of the DC/DC converter is connected to a direct current power source. When the DC/AC converter is in a power limiting working mode, the DC/AC converter obtains a current output state parameter of the DC/DC converter in each power supply unit, determines a reference output current value of the DC/DC converter in each power supply unit based on the current output state parameter of the DC/DC converter in each power supply unit, and adjusts a current output power of the DC/DC converter in each power supply unit based on the reference output current value of the DC/DC converter in each power supply unit.

In this embodiment of this application, the DC/AC converter may adjust the current output power of each DC/DC converter based on a current actual power supply capability of the DC/DC converter in each power supply unit connected in parallel to the direct current bus, to ensure that output powers of the DC/DC converters are balanced, and applicability is high.

With reference to the first aspect, in a first possible embodiment, before the DC/AC converter is in the power limiting working mode, the DC/AC converter determines that the current output power of the photovoltaic system is greater than a system output power threshold.

With reference to the first aspect, in a second possible embodiment, the current output state parameter of the DC/DC converter in each power supply unit includes a current output power and a current output capability of the DC/DC converter in each power supply unit. The DC/AC converter adjusts the current output power of the DC/DC converter in each power supply unit based on the current output power and the current output capability of the DC/DC converter in each power supply unit, to prevent one or some of the DC/DC converters in the photovoltaic system from working in a limit working state.

In this embodiment of this application, the DC/AC converter may adjust the current output power of each DC/DC converter based on a current actual output capability of the DC/DC converter connected in parallel to the direct current bus, to ensure that output powers of the DC/DC converters are balanced, preventing one or some of the DC/DC converters from working at an output power that exceeds a current maximum output power of the DC/DC converter. This provides high applicability.

With reference to the first aspect, in a third possible embodiment, the current output state parameter of the DC/DC converter in each power supply unit includes a current maximum output power of the DC/DC converter in each power supply unit. The DC/AC converter determines, based on the current maximum output power of the DC/DC converter in the power supply unit, a current maximum output power proportion that is of the current maximum output power of the DC/DC converter in each power supply unit and that is in a sum of current maximum output powers of the DC/DC converters in the at least two power supply units, and determines the reference output current value of the DC/DC converter in each power supply unit based on the current maximum output power proportion.

In this embodiment of this application, when the current output state parameter of each DC/DC converter includes the current maximum output power of each DC/DC converter, the reference output current value of each DC/DC converter may be determined based on the current maximum output power of each DC/DC converter.

With reference to the first aspect, in a fourth possible embodiment, the current output state parameter of the DC/DC converter in each power supply unit further includes a current device working condition parameter of the DC/DC converter in each power supply unit; and the DC/AC converter determines, based on the current device working condition parameter and the current maximum output power of the DC/DC converter in each power supply unit, a current corrected output power of the DC/DC converter in each power supply unit, determines, based on the current corrected output power of the DC/DC converter in each power supply unit, a current corrected output power proportion that is of the current corrected output power of the DC/DC converter in each power supply unit and that is in a sum of current corrected output powers of the DC/DC converters in the at least two power supply units, and determines the current corrected output power proportion as the current maximum output power proportion.

In this embodiment of this application, the DC/AC converter may determine the reference output current value of each DC/DC converter based on the current maximum output power and the current device working condition parameter of each DC/DC converter.

With reference to the first aspect, in a fifth possible embodiment, the DC/AC converter obtains a power attenuation coefficient corresponding to the current device working condition parameter of the DC/DC converter in each power supply unit, and determines the current corrected output power of the DC/DC converter in each power supply unit based on the current maximum output power and the power attenuation coefficient of the DC/DC converter in each power supply unit.

In this embodiment of this application, a maximum output power of the DC/DC converter whose device temperature is excessively high, device current stress is excessively high, or device voltage stress is excessively high may be reduced based on the power attenuation coefficient, to prolong service lives of DC/DC converters.

With reference to the first aspect, in a sixth possible embodiment, the current device working condition parameter includes at least one of a current device temperature, a current device current stress, or a current device voltage stress.

With reference to the first aspect, in a seventh possible embodiment, the current output state parameter of the DC/DC converter in each power supply unit further includes a current output current of the DC/DC converter in each power supply unit; and the DC/AC converter determines the reference output current value of the DC/DC converter in each power supply unit based on the current maximum output power proportion and a sum of current output currents of the DC/DC converters in the at least two power supply units.

In this embodiment of this application, when the current output state parameter of each DC/DC converter includes the current output current of each DC/DC converter, a product of the current maximum output power proportion of each DC/DC converter and the sum of current output currents of all DC/DC converters may be determined as the reference output current value of each DC/DC converter, so that an output current value of each DC/DC converter is appropriately allocated based on a current actual output capability of each DC/DC converter.

According to a second aspect, this application provides a photovoltaic system. The photovoltaic system includes a direct current bus, at least two power supply units connected in parallel to the direct current bus, and a system control unit that establishes a communication connection to the at least two power supply units. The system control unit obtains a current power supply state parameter of each of the at least two power supply units, determines a reference power supply current value of each power supply unit based on the current power supply state parameter of each power supply unit, and adjusts a current supply power of each power supply unit based on the reference power supply current value of each power supply unit.

In this embodiment of this application, the system control unit may adjust the current supply power of each power supply unit based on a current actual power supply capability of each power supply unit connected in parallel to the direct current bus, to ensure appropriate load distribution between the power supply units, that is, ensure that supply powers are balanced between the power supply units. This provides high applicability.

With reference to the second aspect, in a first possible embodiment, before obtaining the current power supply state parameter of each of the at least two power supply units, the system control unit determines that a current output power of the photovoltaic system is greater than a system output power threshold.

In this embodiment of this application, when the current output power of the photovoltaic system is greater than the system output power threshold, the system control unit performs appropriate load distribution between the power supply units.

With reference to the second aspect, in a second possible embodiment, the current power supply state parameter of each power supply unit includes a current supply power and a current power supply capability of each power supply unit, and the system control unit adjusts the current supply power of each power supply unit based on the current supply power and the current power supply capability of each power supply unit, to prevent one or some of the at least two power supply units from working in a limit working state.

In this embodiment of this application, the system control unit may adjust the current supply power of each power supply unit based on a current actual supply capability of each power supply unit connected in parallel to the direct current bus, to ensure that supply powers are balanced between the power supply units, so as to prevent one or some of the power supply units from performing power supplying at a supply power that exceeds a current maximum supply power of the power supply units. This provides high applicability.

With reference to the second aspect, in a third possible embodiment, the current power supply state parameter of each power supply unit includes a current maximum supply power of each power supply unit, and the system control unit determines, based on the current maximum supply power of each power supply unit, a current maximum supply power proportion that is of the current maximum supply power of each power supply unit and that is in a sum of current maximum supply powers of the at least two power supply units, and determines the reference power supply current value of each power supply unit based on the current maximum supply power proportion.

In this embodiment of this application, when the current power supply state parameter of each power supply unit includes the current maximum supply power of each power supply unit, the reference power supply current value of each power supply unit may be determined based on the current maximum supply power of each power supply unit.

With reference to the second aspect, in a fourth possible embodiment, the current power supply state parameter of each power supply unit further includes a current device working condition parameter of each power supply unit, and the system control unit determines a current corrected supply power of each power supply unit based on the current device working condition parameter and the current maximum supply power of each power supply unit, and determines, based on the current corrected supply power of each power supply unit, a current corrected supply power proportion that is of the current corrected supply power of each power supply unit and that is in a sum of current corrected supply powers of the at least two power supply units, and determines the current corrected supply power proportion as the current maximum supply power proportion.

In this embodiment of this application, the system control unit may determine the reference power supply current value of each power supply unit based on the current maximum supply power of each power supply unit and the current device working condition parameter.

With reference to the second aspect, in a fifth possible embodiment, the system control unit obtains a power attenuation coefficient corresponding to the current device working condition parameter of each power supply unit, and determines the current corrected supply power of each power supply unit based on the current maximum supply power and the power attenuation coefficient of each power supply unit.

In this embodiment of this application, a maximum supply power of the power supply unit whose device temperature is excessively high, device current stress is excessively high, or device voltage stress is excessively high may be reduced based on a power attenuation coefficient, to prolong a service life of each power supply unit.

With reference to the second aspect, in a sixth possible embodiment, the current device working condition parameter includes at least one of a current device temperature, a current device current stress, or a current device voltage stress.

With reference to the second aspect, in a seventh possible embodiment, the current power supply state parameter of each power supply unit further includes a current power supply current of each power supply unit, and the system control unit determines the reference power supply current value of each power supply unit based on the current maximum supply power proportion and a sum of current power supply currents of the at least two power supply units.

In this embodiment of this application, when the current power supply state parameter of each power supply unit includes the current power supply current of each power supply unit, a product of the current maximum supply power proportion of each power supply unit and the sum of current power supply currents of all power supply units may be determined as the reference power supply current value of each power supply unit, so that a power supply current value of each power supply unit is appropriately allocated based on a current actual power supply capability of each power supply unit.

With reference to the second aspect, in an eighth possible embodiment, the system control unit sends a supply power correct instruction to each power supply unit, to enable each power supply unit to adjust the current supply power of each power supply unit to a reference supply power of each power supply unit based on the reference power supply current value of each power supply unit included in the supply power correct instruction, and the reference supply power of each power supply unit is determined based on the reference power supply current value of each power supply unit.

With reference to the second aspect, in a ninth possible embodiment, the system control unit determines a control correction value of each power supply unit based on the reference power supply current value and the current power supply state parameter of each power supply unit, and sends a supply power correct instruction to each power supply unit, to enable each power supply unit to adjust the current supply power of each power supply unit to a reference supply power of each power supply unit based on the control correction value of each power supply unit included in the supply power correct instruction, and the reference supply power of each power supply unit is determined based on the reference power supply current value of each power supply unit.

In this embodiment of this application, after obtaining the control correction value of each power supply unit through calculation, the system control unit sends, to each power supply unit, the supply power correct instruction including the control correction value of the power supply unit. Each power supply unit obtains a target bus reference voltage of each power supply unit through calculation based on the control correction value of each power supply unit, and adjusts a power supply current value between each power supply unit and the direct current bus based on the target bus reference voltage of each power supply unit, to reduce a calculation amount of the system control unit and improve processing efficiency of the system control unit.

With reference to the second aspect, in a tenth possible embodiment, the system control unit determines a control correction value of each power supply unit based on the reference power supply current value and the current power supply state parameter of each power supply unit, determines a target bus reference voltage of each power supply unit based on an initial bus reference voltage and the control correction value of each power supply unit, and sends a supply power correct instruction to each power supply unit, to enable each power supply unit to adjust the current supply power of each power supply unit to a reference supply power of each power supply unit based on the target bus reference voltage of each power supply unit included in the supply power correct instruction, and the reference supply power of each power supply unit is determined based on the reference power supply current value of each power supply unit.

In this embodiment of this application, each power supply unit does not need to calculate a target bus reference voltage of the power supply unit, and may directly adjust the power supply current value between the power supply unit and the direct current bus based on the target bus reference voltage included in the supply power correct instruction, to reduce a calculation amount of each power supply unit and improve processing efficiency of each power supply unit.

With reference to the second aspect, in an eleventh possible embodiment, the system control unit determines the target bus reference voltage of each power supply unit based on the initial bus reference voltage, the control correction value of each power supply unit, and a voltage correction value of each power supply unit, and the voltage correction value of each power supply unit is determined based on the current power supply state parameter of each power supply unit and a virtual impedance of each power supply unit.

In this embodiment of this application, the initial bus reference voltage of each power supply unit may be corrected based on the control correction value of each power supply unit, to implement appropriate load distribution between the power supply units. Further, the initial bus reference voltage of each power supply unit is further corrected based on a droop characteristic of the virtual impedance, so as to ensure that each power supply unit is in a stable power supply state.

With reference to the second aspect, in a twelfth possible embodiment, the virtual impedance is determined based on the current power supply state parameter of the power supply unit.

With reference to the second aspect, in a thirteenth possible embodiment, a first power supply unit in the at least two power supply units includes a system control unit.

With reference to the second aspect, in a fourteenth possible embodiment, the power supply unit includes a DC/DC converter or a DC/AC converter, and the DC/DC converter is configured to adjust a current supply power of the DC/DC converter, and the DC/AC converter is configured to adjust a current supply power of the DC/AC converter.

In this embodiment of this application, the power supply unit may include the DC/DC converter connected in parallel to the direct current bus or the DC/AC converter connected in parallel to the direct current bus, so that applicability of a photovoltaic system can be improved.

According to a third aspect, this application provides a power supply current control method of a photovoltaic system. The photovoltaic system includes a direct current bus, at least two power supply units connected in parallel to the direct current bus, and a DC/AC converter connected to the at least two power supply units through the direct current bus. Each of the at least two power supply units includes a DC/DC converter, and an input end of the DC/DC converter is connected to a direct current power source. When the DC/AC converter is in a power limiting working mode, the DC/AC converter obtains a current output state parameter of the DC/DC converter in each power supply unit, determines a reference output current value of the DC/DC converter in each power supply unit based on the current output state parameter of the DC/DC converter in each power supply unit, and adjusts a current output power of the DC/DC converter in each power supply unit based on the reference output current value of the DC/DC converter in each power supply unit.

With reference to the third aspect, in a first possible embodiment, the current output state parameter of the DC/DC converter in each power supply unit includes a current output power and a current output capability of the DC/DC converter in each power supply unit. The DC/AC converter adjusts the current output power of the DC/DC converter in each power supply unit based on the current output power and the current output capability of the DC/DC converter in each power supply unit, to prevent one or some of the DC/DC converters in the photovoltaic system from working in a limit working state.

With reference to the third aspect, in a second possible embodiment, the current output state parameter of the DC/DC converter in each power supply unit includes a current maximum output power of the DC/DC converter in each power supply unit. The DC/AC converter determines, based on the current maximum output power of the DC/DC converter in each power supply unit, a current maximum output power proportion that is of the current maximum output power of the DC/DC converter in each power supply unit and that is in a sum of current maximum output powers of the DC/DC converters in the at least two power supply units, and determines the reference output current value of the DC/DC converter in each power supply unit based on the current maximum output power proportion.

With reference to the third aspect, in a third possible embodiment, the current output state parameter of the DC/DC converter in each power supply unit further includes a current device working condition parameter of the DC/DC converter in each power supply unit. The DC/AC converter determines, based on the current device working condition parameter and the current maximum output power of the DC/DC converter in each power supply unit, a current corrected output power of the DC/DC converter in each power supply unit, determines, based on the current corrected output power of the DC/DC converter in each power supply unit, a current corrected output power proportion that is of the current corrected output power of the DC/DC converter in each power supply unit and that is in a sum of current corrected output powers of the DC/DC converters in the at least two power supply units, and determines the current corrected output power proportion as the current maximum output power proportion.

According to a fourth aspect, this application provides a power supply current control method of a photovoltaic system. The photovoltaic system includes a direct current bus and at least two power supply units connected in parallel to the direct current bus. The method includes: obtaining a current power supply state parameter of each of the at least two power supply units, determining a reference power supply current value of each power supply unit based on the current power supply state parameter of each power supply unit, and adjusting a current supply power of each power supply unit based on the reference power supply current value of each power supply unit.

With reference to the fourth aspect, in a first possible embodiment, the method includes: when the current output power of the photovoltaic system is greater than a system output power threshold, obtaining a current power supply state parameter of each of the at least two power supply units.

With reference to the fourth aspect, in a second possible embodiment, the current power supply state parameter of each power supply unit includes a current supply power and a current power supply capability of each power supply unit. The method includes: adjusting the current supply power of each power supply unit based on the current supply power and the current power supply capability of each power supply unit, to prevent one or some of the at least two power supply units from working in a limit working state.

With reference to the fourth aspect, in a third possible embodiment, the current power supply state parameter of each power supply unit includes a current maximum supply power of each power supply unit, and the method includes: determining, based on the current maximum supply power of each power supply unit, a current maximum supply power proportion that is of the current maximum supply power of each power supply unit and that is in a sum of current maximum supply powers of the at least two power supply units, and determining the reference power supply current value of each power supply unit based on the current maximum supply power proportion.

With reference to the fourth aspect, in a fourth possible embodiment, the current power supply state parameter of each power supply unit further includes a current device working condition parameter of each power supply unit. The method includes: determining a current corrected supply power of each power supply unit based on the current device working condition parameter and the current maximum supply power of each power supply unit, determining, based on the current corrected supply power of each power supply unit, a current corrected supply power proportion that is of the current corrected supply power of each power supply unit and that is in a sum of current corrected supply powers of the at least two power supply units, and determining the current corrected supply power proportion as the current maximum supply power proportion.

With reference to the fourth aspect, in a fifth possible embodiment, the method includes: obtaining a power attenuation coefficient corresponding to the current device working condition parameter of each power supply unit, and determining the current corrected supply power of each power supply unit based on the current maximum supply power and the power attenuation coefficient of each power supply unit.

With reference to the fourth aspect, in a sixth possible embodiment, the current device working condition parameter includes at least one of a current device temperature, a current device current stress, or a current device voltage stress.

With reference to the fourth aspect, in a seventh possible embodiment, the current power supply state parameter of each power supply unit further includes a current power supply current of each power supply unit. The method includes: determining the reference power supply current value of each power supply unit based on the current maximum supply power proportion and a sum of current power supply currents of the at least two power supply units.

With reference to the fourth aspect, in an eighth possible embodiment, the method includes: sending a supply power correct instruction to each power supply unit, to enable each power supply unit to adjust the current supply power of each power supply unit to a reference supply power of each power supply unit based on the reference power supply current value of each power supply unit included in the supply power correct instruction, where the reference supply power of each power supply unit is determined based on the reference power supply current value of each power supply unit.

With reference to the fourth aspect, in a ninth possible embodiment, the method includes: determining a control correction value of each power supply unit based on the reference power supply current value and the current power supply state parameter of each power supply unit, and sending a supply power correct instruction to each power supply unit, to enable each power supply unit to adjust the current supply power of each power supply unit to a reference supply power of each power supply unit based on the control correction value of each power supply unit included in the supply power correct instruction, where the reference supply power of each power supply unit is determined based on the reference power supply current value of each power supply unit.

With reference to the fourth aspect, in a tenth possible embodiment, the method includes: determining a control correction value of each power supply unit based on the reference power supply current value and the current power supply state parameter of each power supply unit, determining a target bus reference voltage of each power supply unit based on an initial bus reference voltage and the control correction value of each power supply unit, and sending a supply power correct instruction to each power supply unit, to enable each power supply unit to adjust the current supply power of each power supply unit to a reference supply power of each power supply unit based on the target bus reference voltage of each power supply unit included in the supply power correct instruction, where the reference supply power of each power supply unit is determined based on the reference power supply current value of each power supply unit.

With reference to the fourth aspect, in an eleventh possible embodiment, the method includes: determining the target bus reference voltage of each power supply unit based on the initial bus reference voltage, the control correction value of each power supply unit, and a voltage correction value of each power supply unit, where the voltage correction value of each power supply unit is determined based on the current power supply state parameter of each power supply unit and a virtual impedance of each power supply unit.

With reference to the fourth aspect, in a twelfth possible embodiment, the virtual impedance is determined based on the current power supply state parameter of the power supply unit.

With reference to the fourth aspect, in any possible embodiment, the power supply unit includes a DC/DC converter or a DC/AC converter, and the DC/DC converter is configured to adjust a current supply power of the DC/DC converter, and the DC/AC converter is configured to adjust a current supply power of the DC/AC converter.

According to a fifth aspect, this application provides a DC/AC converter of a photovoltaic system. The photovoltaic system includes a direct current bus, at least two power supply units connected in parallel to the direct current bus, and a DC/AC converter connected to the at least two power supply units through the direct current bus. Each of the at least two power supply units includes a DC/DC converter, and an input end of the DC/DC converter is connected to a direct current power source. The DC/AC converter includes:

an obtaining and determining module, configured to: when the DC/AC converter is in a power limiting working mode, obtain a current output state parameter of the DC/DC converter in each power supply unit and determine a reference output current value of the DC/DC converter in each power supply unit based on the current output state parameter of the DC/DC converter in each power supply unit; and a power adjustment module, configured to adjust a current output power of the DC/DC converter in each power supply unit based on the reference output current value of the DC/DC converter in each power supply unit.

According to a sixth aspect, this application provides a power supply current control apparatus of a photovoltaic system. The photovoltaic system includes a direct current bus and at least two power supply units connected in parallel to the direct current bus. The power supply current control apparatus includes:

an obtaining and determining module, configured to obtain a current power supply state parameter of each of the at least two power supply units, and determine a reference power supply current value of each power supply unit based on the current power supply state parameter of each power supply unit; and a power adjustment module, configured to adjust a current supply power of each power supply unit based on the reference power supply current value of each power supply unit.

It should be understood that mutual reference may be made to the embodiments and beneficial effects of the foregoing aspects of this application.

DESCRIPTION OF EMBODIMENTS

When a plurality of power supply units are connected in parallel, due to a parameter or sampling difference between the power supply units, it is difficult to ensure appropriate load distribution between the power supply units. As a result, large currents are distributed on some power supply units, and thermal stresses increase, finally affecting service lives of the power supply units. However, service lives of the power supply units included in a power supply system is inconsistent, and finally, operation and maintenance costs of the entire power supply system are increased.

According to a photovoltaic system, a power supply current control method and apparatus, and a power supply unit thereof provided in this application, a reference power supply current value of each power supply unit may be determined based on a power supply state parameter of each parallel power supply unit, to implement appropriate load allocation based on an actual power supply capability of each power supply unit, so that service lives of the power supply units are prolonged, and operation and maintenance costs of the photovoltaic system is reduced.

Figure 1:
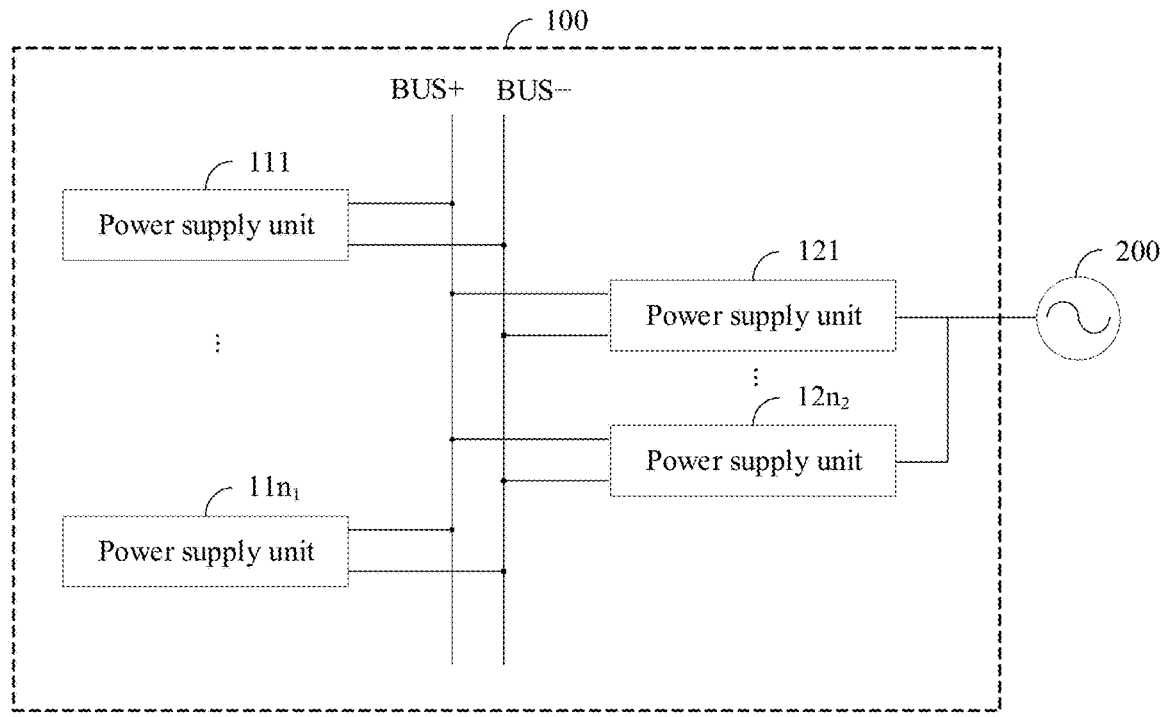
FIG. 1 is a schematic diagram of a structure of a photovoltaic system according to this application.

FIG. 1 is a schematic diagram of a structure of a photovoltaic system according to this application. As shown in FIG. 1, the photovoltaic system 100 includes a direct current bus BUS (corresponding to a positive direct current bus BUS+ and a negative direct current bus BUS− in FIG. 1), and power supply units connected in parallel to the direct current bus BUS. For example, the power supply units may include a power supply unit 111, . . . , and a power supply unit 11n₁, or include a power supply unit 121, . . . , and a power supply unit 12n₂, where n₁ is an integer greater than or equal to 2, and n₂ is an integer greater than or equal to 1. When the power supply units include the power supply unit 111, . . . , and the power supply unit 11n₁, the photovoltaic system 100 may implement appropriate load distribution between the power supply unit 111, . . . , and the power supply unit 11n₁; or when the power supply units include the power supply unit 121, . . . , and the power supply unit 12n₂, and n₂ is an integer greater than or equal to 2, the photovoltaic system 100 may implement appropriate load distribution between the power supply unit 121, . . . , and the power supply unit 12n₂.

The power supply unit 111, . . . , and the power supply unit 11n₁ each include a DC/DC converter. An input end of the DC/DC converter is connected to a direct current power source, and is configured to implement direct current voltage conversion between the direct current power source and the direct current bus. In some embodiments, the direct current power source may be a photovoltaic string. In this case, the DC/DC converter may perform direct current conversion on electric energy of the photovoltaic string and then supply electric energy to the direct current bus, to implement power supply for the direct current bus. Alternatively, the direct current power source may be an energy storage battery string. In this case, the DC/DC converter may perform direct current conversion on electric energy on the direct current bus and then supply electric energy to the energy storage battery string, to charge the energy storage battery string. The photovoltaic string may include a plurality of photovoltaic modules connected in series and/or in parallel. The photovoltaic module is a direct current power source formed by packaging solar panels in series and parallel, and is configured to convert solar energy into electric energy. The energy storage battery string may include a plurality of energy storage batteries connected in series and/or in parallel. The power supply unit 121, . . . , and the power supply unit 12n₂ each include a DC/AC converter, which may be configured to convert, through inversion, a direct current on the direct current bus into an alternating current meeting a power requirement of a load, or convert, through inversion, the direct current on the direct current bus into an alternating current meeting a requirement of a mains power grid. In another embodiment, a step-up transformer (not shown in the figure) may be connected between an output end of each of the power supply unit 121, . . . , and the power supply unit 12n₂, and a power grid 200, which may be determined based on an application environment. This is not limited herein. The photovoltaic system 100 may output the alternating current obtained through inversion to a load or the power grid 200.

In some embodiments, the photovoltaic system 100 further includes a system control unit (not shown in the figure). The system control unit is configured to: communicate with the power supply unit 111, . . . , and the power supply unit 11n₁, or communicate with the power supply unit 121, . . . , and the power supply unit 12n₂, and obtain, through communication, power supply state parameters of the power supply unit 111, . . . , and the power supply unit 11n₁, or power supply state parameters of the power supply unit 121, . . . , and the power supply unit 12n₂. The system control unit may be an independent device, or may be integrated in another device of the photovoltaic system 100, for example, integrated in any one of the power supply unit 111, . . . , and the power supply unit 11n₁, or integrated in any one of the power supply unit 121, . . . , and the power supply unit 12n₂. The system control unit communicates with the power supply unit through wireless communication (such as Wi-Fi, Lora, and ZigBee) or PLC communication.

The following provides an example for implementing appropriate load distribution between the power supply unit 111, . . . , and the power supply unit 11n₁. The system control unit (not shown in the figure) in the photovoltaic system 100 determines reference power supply current values of the power supply unit 111, . . . , and the power supply unit 11n₁ based on the power supply state parameters of the power supply unit 111, . . . , and the power supply unit 11n₁, and separately sends a bus power supply current correct instruction to each of the power supply unit 111, . . . , and the power supply unit 11n₁. Each of the power supply unit 111, . . . , and the power supply unit 11n₁ adjusts, based on the received bus power supply current correct instruction, a bus power supply current value between the power supply unit and the direct current bus to be the respective reference power supply current value. Herein, when n₂ is an integer greater than or equal to 2, for an embodiment of appropriate load distribution between the power supply unit 121, . . . , and the power supply unit 12n₂, refer to the embodiment of appropriate load distribution between the power supply unit 111, . . . , and the power supply unit 11n₁.

In the foregoing power supply current control manner of the photovoltaic system, when an output power of the photovoltaic system is greater than a system output power threshold, a power supply current value of each power supply unit may be distributed based on a current actual power supply capability of each power supply unit connected in parallel to the direct current bus, to implement appropriate load distribution between the power supply units, prolong service lives of power supply units, and reduce operation and maintenance costs of the photovoltaic system.

Figure 2:
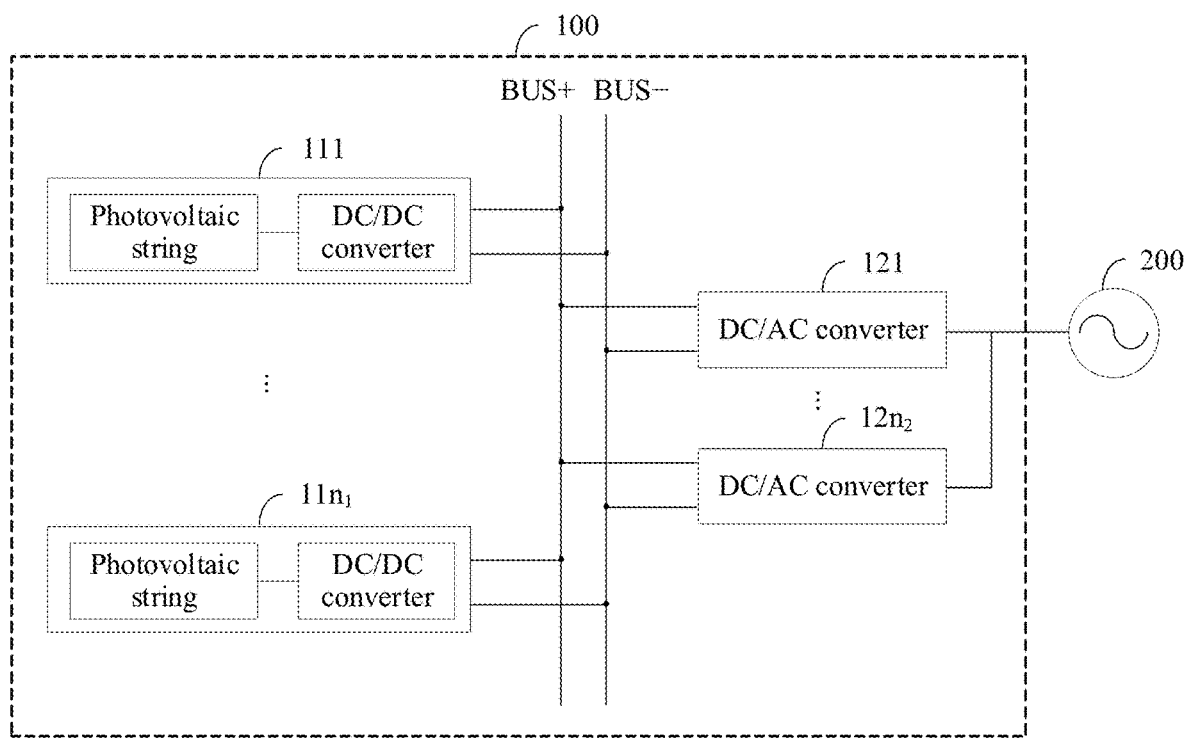
FIG. 2 is a schematic diagram of a structure of a pure solar system according to this application.

In an embodiment, the technical solutions provided in this application may be applied to a pure solar photovoltaic scenario, and the photovoltaic system provided in this application is a pure solar system. FIG. 2 is a schematic diagram of a structure of a pure solar system according to this application. As shown in FIG. 2, each of the power supply unit 111, . . . , and the power supply unit $11n_1$ may include a DC/DC converter and a photovoltaic string connected to an input end of the DC/DC converter, and each of the power supply unit 121, . . . , and the power supply unit $12n_2$ may be a DC/AC converter whose input end is connected to the direct current bus BUS. In another embodiment, the pure solar system 100 may alternatively be applied to an uninterruptible power supply scenario, that is, an energy storage battery, for example, a nickel-cadmium battery, a nickel-hydrogen battery, a lithium-ion battery, or a lithium polymer battery, may be disposed between the DC/AC converter and the power grid 200.

Figure 3:
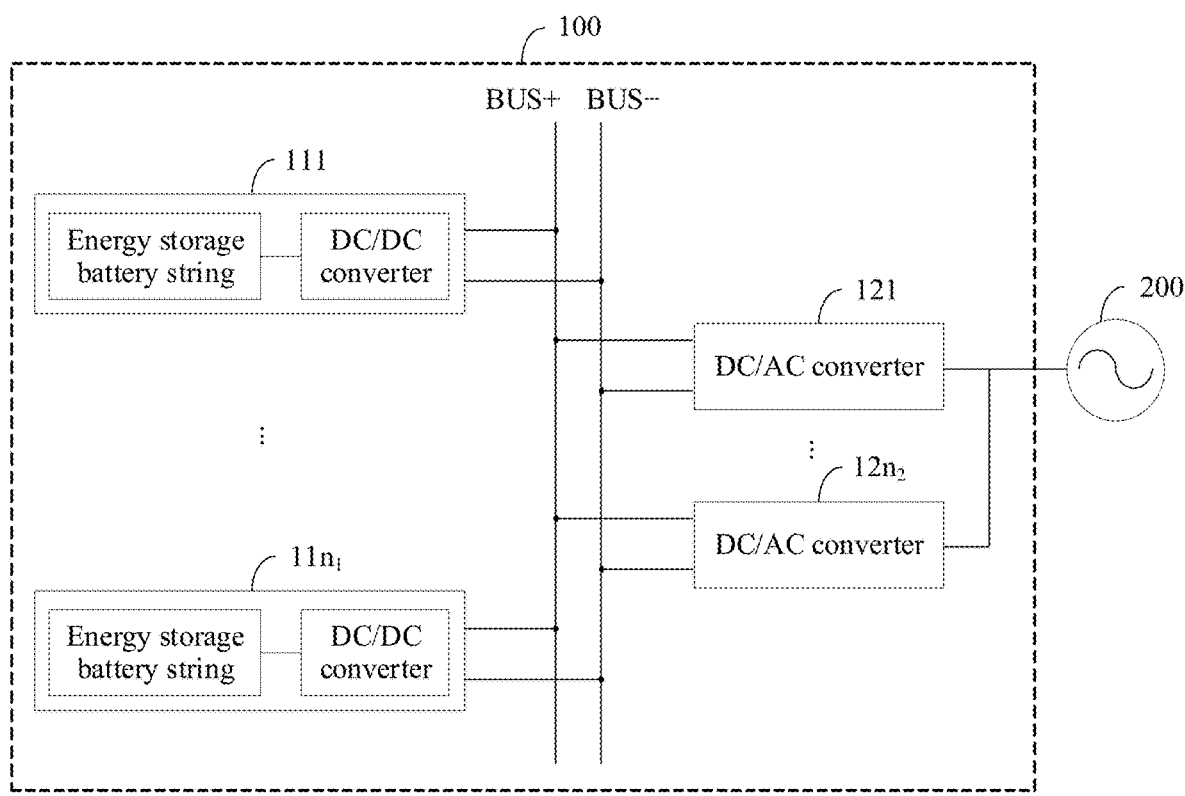
FIG. 3 is a schematic diagram of a structure of a pure storage system according to this application.

In another embodiment, the technical solutions provided in this application may be applied to a pure storage photovoltaic scenario, and the photovoltaic system provided in this application is a pure storage system. FIG. 3 is a schematic diagram of a structure of a pure storage system according to this application. As shown in FIG. 3, each of the power supply unit 111, . . . , and the power supply unit $11n_1$ may include a DC/DC converter and an energy storage battery string connected to an input end of the DC/DC converter, and each of the power supply unit 121, . . . , and the power supply unit $12n_2$ may be a DC/AC converter whose input end is connected to the direct current bus BUS. In another embodiment scenario, the pure storage system 100 may alternatively be applied to an uninterruptible power supply scenario, that is, an energy storage battery, for example, a nickel-cadmium battery, a nickel-hydrogen battery, a lithium-ion battery, or a lithium polymer battery, may be disposed between the DC/AC converter and the power grid 200.

Figure 4:
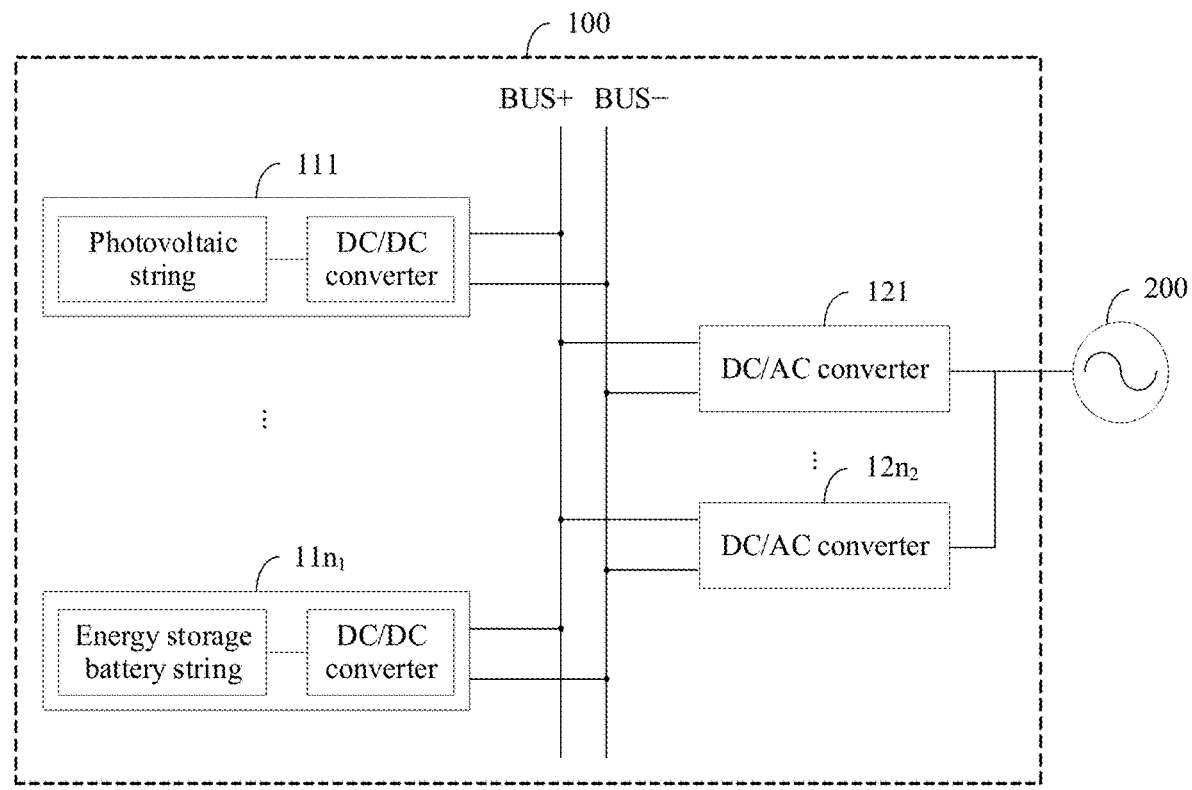
FIG. 4 is a schematic diagram of a structure of an optical storage system according to this application.

In still another embodiment, the technical solutions provided in this application may be applied to a photovoltaic scenario of optical storage, and the photovoltaic system provided in this application is an optical storage system. FIG. 4 is a schematic diagram of a structure of an optical storage system according to this application. As shown in FIG. 4, the power supply unit 111, . . . , and the power supply unit $11n_1$ include a power supply unit including a DC/DC converter and a photovoltaic string connected to an input end of the DC/DC converter, and also include a power supply unit including a DC/DC converter and an energy storage battery string connected to an input end of the DC/DC converter, and each of the power supply unit 121, . . . , and the power supply unit $12n_2$ may be a DC/AC converter whose input end is connected to the direct current bus BUS. In another embodiment, the optical storage system 100 may alternatively be applied to an uninterruptible power supply scenario, that is, an energy storage battery, for example, a nickel-cadmium battery, a nickel-hydrogen battery, a lithium-ion battery, or a lithium polymer battery, may be disposed between the DC/AC converter and the power grid 200.

With reference to FIG. 1, the following describes an embodiment of power supply current control of the photovoltaic system by using an example in which $n_2$ an integer greater than or equal to 2.

In some embodiments, when a current output power of the photovoltaic system is greater than the system output power threshold, the system control unit sends a power supply parameter obtain instruction to the power supply units (corresponding to the power supply unit 111, . . . , and the power supply unit $11n_1$ in FIG. 1, and the power supply unit 121, . . . , and the power supply unit $12n_2$ in FIG. 1) connected in parallel to the direct current bus BUS. Each power supply unit sends a current power supply state parameter of the power supply unit to the system control unit based on the power supply parameter obtain instruction. The system output power threshold may be an output power threshold included in a power limit instruction sent by a user to the photovoltaic system, that is, the system output power threshold may be manually limited.

Then, the system control unit determines a reference power supply current value of each power supply unit based on a received current power supply state parameter of each power supply unit.

In an embodiment, the current power supply state parameter of each power supply unit includes a current maximum supply power of each power supply unit.

When the power supply unit is any one of the power supply unit 111, . . . , and the power supply unit $11n_1$ in FIG. 1, the current maximum supply power of the power supply unit is a current maximum output power of the DC/DC converter in the power supply unit, that is, a maximum output power currently allowed by the DC/DC converter. When the power supply unit is any one of the power supply unit 121, . . . , and the power supply unit $12n_2$ in FIG. 1, the current maximum supply power of the power supply unit is a current maximum input power of the DC/AC converter in the power supply unit, that is, a maximum input power currently allowed by the DC/AC converter.

The system control unit may obtain the system output power threshold and a direct current bus voltage, and determine a quotient of the system output power threshold and the direct current bus voltage as a total current existing after power limiting of the photovoltaic system.

The system control unit may determine, based on the current maximum supply powers of the power supply units, that a current maximum supply power proportion of an $i^{th}$ power supply unit is $P_{Mi}/(P_{M1}+ \ldots +P_{Mi}+ \ldots +P_{Mn})$, where $P_{M1}, P_{Mi} \ldots$, and $P_{Mn}$ are a current maximum supply power of a first power supply unit, . . . , a current maximum supply power of the $i^{th}$ power supply unit, . . . , and a current maximum supply power of an $n^{th}$ power supply unit, and i is an integer greater than or equal to 1 and less than or equal to n.

For example, it is assumed that the power supply units are the power supply unit 111, . . . , and the power supply unit 11 in FIG. 1, and a current maximum supply power proportion of the power supply unit 11 is $P_{OMn_1}/(P_{OM1}+ \ldots +P_{OMn_1})$, where $P_{OM1}, \ldots$, and $P_{OMn_1}$ are a current maximum output power of a DC/DC converter in the power supply unit 111, . . . , and a current maximum output power of a DC/DC converter in the power supply unit $11n_1$.

For another example, it is assumed that the power supply units are the power supply unit 121, . . . , and the power supply unit $12n_2$ in FIG. 1, and a current maximum supply power proportion of the power supply unit $12n_2$ is $P_{IMn_2}/(P_{IM1}+ \ldots +P_{IMn_2})$, where $P_{IM1}, \ldots,$ and $P_{IMn_2}$ are a current maximum input power of the DC/AC converter in the power supply unit $121, \ldots,$ and a current maximum input power of the DC/AC converter in the power supply unit $12n_2$.

Further, the current power supply state parameter of each power supply unit further includes a current device working condition parameter of each power supply unit.

The system control unit may further determine a current corrected supply power of each power supply unit based on the current device working condition parameter and the current maximum supply power of each power supply unit, determine, based on the current corrected supply power of each power supply unit, a current corrected supply power proportion that is of the current corrected supply power of each power supply unit and that is in a sum of current corrected supply powers of at least two power supply units, and determine the current corrected supply power proportion of each power supply unit as the current maximum supply power proportion of each power supply unit.

When the power supply unit is any one of the power supply unit $111, \ldots,$ and the power supply unit $11n_1$ in FIG. 1, the current device working condition parameter of the power supply unit may be a current device working condition parameter of the DC/DC converter in the power supply unit. When the power supply unit is any one of the power supply unit $121, \ldots,$ and the power supply unit $12n_2$ in FIG. 1, the current device working condition parameter of the power supply unit may be a current device working condition parameter of the DC/AC converter in the power supply unit. The current device working condition parameter includes at least one of a current device temperature, a current device current stress, or a current device voltage stress, the current device current stress is a ratio of a current working voltage of the device to a rated voltage, and the current device current stress is a ratio of a current working current of the device to a rated current. For example, a current device voltage stress of the power supply unit 111 is a ratio of a current output voltage to a rated voltage of the DC/DC converter in the power supply unit 111, and a current device current stress of the power supply unit 111 is a ratio of a current output current to a rated current of the DC/DC converter in the power supply unit 111.

The following uses an example in which the current device working condition parameter is the current device temperature.

In some embodiments, the system control unit may obtain a power attenuation coefficient corresponding to the current device temperature of each power supply unit by looking up a table, determine a product of the current maximum supply power of each power supply unit and the power attenuation coefficient corresponding to the current device temperature of each power supply unit as the current corrected supply power of each power supply unit, and calculate the current corrected supply power proportion of each power supply unit based on the current corrected supply power of each power supply unit, determine the current corrected supply power proportion of each power supply unit as the current maximum supply power proportion of each power supply unit. A relationship between the power attenuation coefficient of the power supply unit and the device temperature may be that the power attenuation coefficient of the power supply unit decreases as the device temperature of the power supply unit increases, or may be that power attenuation coefficients of different values are corresponding to different device temperature ranges, which is not limited herein. Except that the current device working condition parameter is the current device temperature, other cases may be obtained in the same manner used when the current device working condition parameter is the current device temperature. Details are not described herein again.

It may be understood that a current maximum supply power of a power supply unit whose device temperature is excessively high, device current stress is excessively high, or device voltage stress is excessively high may be reduced based on the power attenuation coefficient, so as to prolong the service life of each power supply unit.

Then, the system control unit determines a product of the total current existing after power limiting of the photovoltaic system and the maximum supply power proportion of each power supply unit as the reference power supply current value of each power supply unit.

It may be understood that, in this embodiment, the reference power supply current value of each power supply unit is obtained through calculation based on the current maximum supply power proportion of each power supply unit and the total current existing after power limiting of the photovoltaic system. In this way, not only appropriate load distribution can be implemented based on the current actual power supply capability of each power supply unit, but also balanced distribution of supply powers of the power supply units is implemented. Therefore, service lives of the power supply units are prolonged, and operation and maintenance costs of the photovoltaic system are reduced. It may also be ensured that after each power supply unit performs feedback adjustment on the respective power supply current value based on the respective reference power supply current value, the output power of the photovoltaic system is less than the system output power threshold.

In another embodiment, the current power supply state parameter of each power supply unit includes a current maximum supply power and a current power supply current of each power supply unit.

When the power supply unit is any one of the power supply unit $111, \ldots,$ and the power supply unit $11n_1$ in FIG. 1, the current maximum supply power and the current power supply current of the power supply unit are respectively a current maximum output power of the DC/DC converter in the power supply unit and a current output current of the DC/DC converter. A current input current $I_{in}$, a current input voltage $U_{in}$, and a current output voltage $U_{out}$ (that is, the direct current bus voltage) of the DC/DC converter may be collected by using the DC/DC converter, so that the current output current $I_{out}=U_{in}*I_{in}/U_{out}$ of the DC/DC converter is obtained through calculation. When the power supply unit is any one of the power supply unit $121, \ldots,$ and the power supply unit $12n_2$ in FIG. 1, the current maximum supply power and the current power supply current of the power supply unit are respectively a current maximum input power of the DC/AC converter in the power supply unit and a current input current of the DC/AC converter in the power supply unit. A current output current $I_{out}$, a current input voltage $U_{in}$ (that is, the direct current bus voltage), and a current output voltage $U_{out}$ of the DC/AC converter may be collected by using the DC/AC converter, so that the current input current $I_{in}=U_{out}*I_{out}/U_{in}$ of the DC/AC converter is obtained through calculation.

The system control unit may calculate, based on the current maximum supply power of each power supply unit connected in parallel to the direct current bus, a current maximum supply power proportion that is of the current maximum supply power of each power supply unit and that is in a sum of current maximum supply powers of the at least two power supply units.

Further, the current power supply state parameter of each power supply unit further includes a current device working condition parameter of each power supply unit.

The system control unit may further determine a current corrected supply power of each power supply unit based on the current device working condition parameter and the current maximum supply power of each power supply unit, determine, based on the current corrected supply power of each power supply unit, a current corrected supply power proportion that is of the current corrected supply power of each power supply unit and that is in a sum of current corrected supply powers of the at least two power supply units, and determine the current corrected supply power proportion of each power supply unit as the current maximum supply power proportion of each power supply unit.

Then, the system control unit determines a product of a sum of current power supply currents of the power supply units and the current maximum supply power proportion of each power supply unit as the reference power supply current value of each power supply unit.

For example, it is assumed that the power supply units are the power supply unit 111, . . . , and the power supply unit $11n_1$ in FIG. 1, and a reference power supply current value of the power supply unit $11n_1$ is $P'_{OMn_1}*(I_{o1}+ \ldots +I_{on_1})$, where $P'_{OMn_1}$ is a current maximum supply power proportion of the power supply unit $11n_1$, and $I_{o1}, \ldots,$ and $I_{on_1}$ are respectively a current output current of the DC/DC converter in the power supply unit 111, . . . , and a current output current of the DC/DC converter in the power supply unit $11n_1$.

For another example, it is assumed that the power supply units are the power supply unit 121, . . . , and the power supply unit $12n_2$ in FIG. 1, and a reference power supply current value of the power supply unit $12n_2$ is $P'_{IMn_2}*(I_{I1}+ \ldots +I_{In_2})$ where $P'_{IMn_2}$ is a current maximum supply power proportion of the power supply unit $12n_2$, and $I_{I1}, \ldots,$ and $I_{In_2}$ are respectively a current input current of the DC/AC converter in the power supply unit 121, . . . , and a current input current of the DC/AC converter in the power supply unit $12n_2$.

In still another embodiment, the current power supply state parameter of each power supply unit includes a current supply power and a current power supply capability of each power supply unit.

The current power supply capability of the power supply unit includes a maximum supply power currently allowed by the power supply unit, that is, a current maximum supply power. When the power supply unit is any one of the power supply unit 111, . . . , and the power supply unit $11n_1$ in FIG. 1, a current maximum supply power of the power supply unit is a current maximum output power of the DC/DC converter in the power supply unit. When the power supply unit is any one of the power supply unit 121, . . . , and the power supply unit $12n_2$ in FIG. 1, a current maximum supply power of the power supply unit is a current maximum input power of the DC/AC converter in the power supply unit.

The system control unit may calculate, based on the current maximum supply power of each power supply unit, a current maximum supply power proportion that is of the current maximum supply power of each power supply unit and that is in a sum of current maximum supply powers of the at least two power supply units.

Further, the current power supply capability of each power supply unit further includes a current device working condition parameter of each power supply unit.

The system control unit may further determine a current corrected supply power of each power supply unit based on the current device working condition parameter and the current maximum supply power of each power supply unit, determine, based on the current corrected supply power of each power supply unit, a current corrected supply power proportion that is of the current corrected supply power of each power supply unit and that is in a sum of current corrected supply powers of the at least two power supply units, and determine the current corrected supply power proportion of each power supply unit as the current maximum supply power proportion of each power supply unit.

Then, the system control unit determines a product of a sum of current power supply currents of the power supply units and the current maximum supply power proportion of each power supply unit as the reference power supply current value of each power supply unit.

It may be understood that, in this embodiment, the current supply power of each power supply unit may be properly distributed based on the current actual supply capability of each power supply unit, to implement supply power balance between the power supply units, and prevent one or some power supply units in the power supply units from working in a limit power supply state. (that is, the power supply unit performs power supplying at a supply power that exceeds a maximum supply power that the power supply unit can currently bear), so that service lives of the power supply units are prolonged and operation and maintenance costs of the photovoltaic system are reduced.

Then, the system control unit adjusts the current supply power of each power supply unit based on the reference power supply current value of each power supply unit, to enable the current supply power of each power supply unit to be a reference supply power of each power supply unit. The reference supply power of the power supply unit is a product of the reference power supply current of the power supply unit and the direct current bus voltage. There are same power supply voltages (that is, the direct current bus voltage) between the power supply units connected in parallel to the direct current bus and the direct current bus. Therefore, when the current supply power of each power supply unit is adjusted to the reference supply power of each power supply unit, only a power supply current value between each power supply unit and the direct current bus needs to be adjusted to the reference power supply current value of each power supply unit.

In some embodiments, the system control unit sends a supply power correct instruction to each power supply unit, and the power supply unit adjusts, according to the received supply power correct instruction, the power supply current value between the power supply unit and the direct current bus to the reference power supply current value of the power supply unit, to enable the current supply power of the power supply unit to be the reference supply power of the power supply unit.

In an embodiment, the supply power correct instruction includes a reference power supply current value of the power supply unit.

When the current power supply state parameter of the power supply unit includes the current power supply current of the power supply unit, the power supply unit may use a difference between the reference power supply current value of the power supply unit and the current power supply current value as an input parameter of a proportional-integral (PI) control algorithm. A control correction value of the power supply unit is determined, and then a sum of the control correction value and an initial bus reference voltage that are of the power supply unit is determined as a target bus reference voltage of the power supply unit. Further, the power supply unit may further determine a virtual impedance value corresponding to the current power supply current of the power supply unit as a virtual impedance value of the power supply unit, determine a product of the current power supply current of the power supply unit and the virtual impedance value as a voltage correction value of the power supply unit, and determine a sum of the voltage correction value, the control correction value, and the initial bus reference voltage of the power supply unit as the target bus reference voltage of the power supply unit.

When the power supply unit is any one of the power supply unit 111, . . . , and the power supply unit $11n_1$ in FIG. 1, the current power supply current of the power supply unit is a current output current of the DC/DC converter in the power supply unit. When the power supply unit is any one of the power supply unit 121, . . . , and the power supply unit $12n_2$ in FIG. 1, the current power supply current of the power supply unit is a current input current of the DC/AC converter in the power supply unit. The virtual impedance value may be a fixed value, or may be a non-positive number that increases as a power supply current or a supply power of the power supply unit increases.

Figure 5:
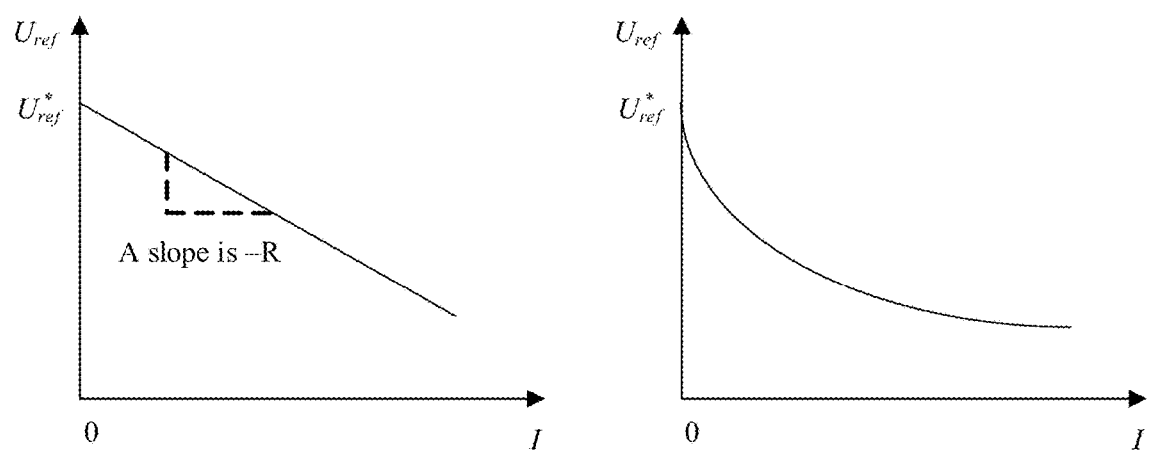
FIG. 5 is a schematic curve diagram of a droop characteristic generated by a virtual impedance on an initial bus reference voltage according to this application.

For ease of understanding, FIG. 5 is a schematic curve diagram of a droop characteristic generated by a virtual impedance on an initial bus reference voltage according to this application. As shown in FIG. 5, a virtual impedance value corresponding to a left part of FIG. 5 is a fixed value, that is, a slope –R of a straight line. The straight line indicates that a bus reference voltage $U_{ref}$ of a power supply unit continuously decreases as a power supply current I of the power supply unit increases, where $U_{ref}=U^*_{ref}-I^*R$, and $U^*_{ref}$ is an initial bus reference voltage of the power supply unit. A virtual impedance value corresponding to a right part of FIG. 5 is a non-positive number that increases as a power supply current or a supply power of a power supply unit increases, that is, the virtual impedance value corresponding to the power supply current I is a slope R (I) of a tangent of the power supply current I at a curve. The curve indicates that a bus reference voltage $U_{ref}$ of the power supply unit continuously decreases as the power supply current I of the power supply unit increases, where $U_{ref}=U^*_{ref}+I^*R(I)$.

It may be understood that, in this embodiment, the power supply unit may determine the control correction value of the power supply unit based on the current power supply current value of the power supply unit and the reference power supply current value of the power supply unit included in the supply power correct instruction, and correct the initial bus reference voltage of the power supply unit based on the control correction value of the power supply unit, to performing power supplying based on the current actual power supply capability of the power supply unit. Further, the power supply unit may further correct the initial bus reference voltage of the power supply unit based on the droop characteristic of the virtual impedance, in this way, it is ensured that the power supply unit is in a stable power supply state. In addition, in this embodiment, the target bus reference voltage of the power supply unit is obtained by the power supply unit through calculation based on the reference power supply current value of the power supply unit sent by the system control unit, which can reduce a calculation amount of the system control unit and improve processing efficiency of the system control unit.

In another embodiment, the supply power correct instruction includes a control correction value of the power supply unit.

Before the system control unit sends the supply power correct instruction to each power supply unit, the system control unit may use a difference between the reference power supply current value of each power supply unit and a corresponding current power supply current value as an input parameter of the PI control algorithm, determine the control correction value of each power supply unit, and send the supply power correct instruction to each power supply unit.

Each power supply unit receives the supply power correct instruction, and determines a sum of an initial bus reference voltage of the power supply unit and the control correction value of the power supply unit included in the supply power correct instruction as a target bus reference voltage of the power supply unit. Further, the power supply unit may further determine a virtual impedance value corresponding to the current power supply current of the power supply unit as a virtual impedance value of the power supply unit, determine a product of the power supply current of the power supply unit and the virtual impedance value as a voltage correction value of the power supply unit, and determine a sum of the voltage correction value, the control correction value, and the initial bus reference voltage of the power supply unit as the target bus reference voltage of the power supply unit.

In another embodiment, the supply power correct instruction includes a target bus reference voltage of the power supply unit.

Before the system control unit sends the supply power correct instruction to each power supply unit, the system control unit may use a difference between the reference power supply current value of each power supply unit and a corresponding current power supply current value as an input parameter of the PI control algorithm, determine a control correction value of each power supply unit, and determine a sum of the control correction value and an initial bus reference voltage that are of each power supply unit as a target bus reference voltage of each power supply unit. Further, the system control unit may further determine a virtual impedance value corresponding to the current power supply current of each power supply unit as a virtual impedance value of each power supply unit, determine a product of the power supply current of each power supply unit and the virtual impedance value as a voltage correction value of each power supply unit, determine a sum of the voltage correction value, the control correction value, and the initial bus reference voltage of each power supply unit as the target bus reference voltage of each power supply unit, and send the power supply power correct instruction including the target bus reference voltage to each power supply unit.

It may be understood that the supply power correct instruction provided in this application may include any one of the reference power supply current value, the control correction value, and the target bus reference voltage of the power supply unit, so that applicability of the photovoltaic system can be improved.

Further, when the current output power of the photovoltaic system is less than or equal to the system output power threshold, the system control unit sends the supply power correct instruction to each power supply unit. Each power supply unit determines the initial bus reference voltage of the power supply unit as the target bus reference voltage of the power supply unit based on the supply power correct instruction.

Then, each power supply unit may output a voltage difference between the target bus reference voltage and the direct current bus voltage of the power supply unit to a switch power source control circuit (for example, a pulse width modulation circuit) of the power supply unit. The switch power source control circuit outputs a PWM wave based on the input voltage difference, and outputs the PWM wave to a switch circuit of the power supply unit, to control a turn-on frequency of the switch circuit, so as to control the power supply current value between each power supply unit and the direct current bus as the reference power supply current value.

When the power supply units are the power supply unit $111, \ldots$, and the power supply unit $11n_1$ in FIG. 1, the power supply current value between each power supply unit and the direct current bus is an output current value of the DC/DC converter in each power supply unit. When the power supply units are the power supply unit $121, \ldots$, and the power supply unit $12n_2$ in FIG. 1, the power supply current value between each power supply unit and the direct current bus is an input current value of the DC/AC converter in each power supply unit.

It should be noted that in this embodiment of this application, the system control unit may be a device that is in the photovoltaic system and that is independent of each power supply unit, or may be a DC/DC converter or a DC/AC converter included in any one of the power supply units connected in parallel to the direct current bus.

In this application, when the output power of the photovoltaic system is greater than the system output power threshold, the system control unit may distribute the power supply current value of each power supply unit based on the current actual power supply capability of each power supply unit connected in parallel to the direct current bus, to implement appropriate load distribution between the power supply units (that is, implement supply power balance between the power supply units), and prevent one or some of the power supply units from working in a limit power supply state, so that service lives of the power supply units are prolonged and operation and maintenance costs of the photovoltaic system are reduced. In addition, when the output power of the photovoltaic system is less than or equal to the system output power threshold, the system control unit no longer performs load balancing on the power supply units, and each power supply unit determines the initial bus reference voltage of each power supply unit as the target bus reference voltage of each power supply unit, and adjusts the power supply current value between each power supply unit and the direct current bus based on the target bus reference voltage of each power supply unit, so that each power supply unit perform power supplying at a current maximum supply power, to improve a power supplying capacity of the photovoltaic system.

With reference to FIG. 1, the following describes an embodiment in which the photovoltaic system controls the power supply current by using an example in which $n_2=1$.

In some embodiments, when a current output power of the photovoltaic system is greater than a system output power threshold, the DC/AC converter sends an output parameter obtain instruction to the DC/DC converters in the power supply unit $111, \ldots$, and the power supply unit $11n_1$ connected in parallel to the direct current bus BUS. The DC/DC converters in the power supply unit $111, \ldots$, and the power supply unit $11n_1$ send respective current output state parameters to the DC/AC converter according to the output parameter obtain instruction.

The DC/AC converter determines a reference output current value of the DC/DC converter in each power supply unit based on the received current output state parameter of the DC/DC converter in each of the power supply unit $111, \ldots$, and the power supply unit $11n_1$.

In an embodiment, the current output state parameter of the DC/DC converter in each power supply unit includes a current maximum output power of the DC/DC converter in each power supply unit.

The DC/AC converter may obtain the system output power threshold and a direct current bus voltage, and determine a quotient of the system output power threshold and the direct current bus voltage as a total current existing after power limiting of the photovoltaic system.

The DC/AC converter may calculate, based on the current maximum output power of the DC/DC converter in each power supply unit, a proportion that is of the current maximum output power of the DC/DC converter in each power supply and that is in a sum of current maximum output powers of all DC/DC converters, to obtain a current maximum output power proportion of the DC/DC converter in each power supply unit.

Further, the current output state parameter of the DC/DC converter in each power supply unit further includes a current device working condition parameter of the DC/DC converter in each power supply unit.

The current device working condition parameter includes at least one of a current device temperature, a current device current stress, or a current device voltage stress.

The DC/AC converter may further determine a current corrected supply power of each DC/DC converter based on the current device working condition parameter and the current maximum supply power of each DC/DC converter, determine, based on the current corrected supply power of each DC/DC converter, a current corrected supply power proportion that is of the current corrected supply power of each DC/DC converter and that is in a sum of current corrected supply powers of at least two DC/DC converters, and determine the current corrected supply power proportion of DC/DC converter as the current maximum output power proportion of each DC/DC converter.

It may be understood that the DC/AC converter may reduce, based on a power attenuation coefficient, a current maximum output power of a DC/DC converter whose device temperature is excessively high, device current stress is excessively high, or device voltage stress is excessively high, to prolong service lives of DC/DC converters.

Then, the DC/AC converter determines a product of the total current existing after power limiting of the photovoltaic system and the maximum output power proportion of each DC/DC converter as the reference output current value of each DC/DC converter.

It may be understood that, in this embodiment, the DC/AC converter obtains the reference output current value of each DC/DC converter through calculation based on the current maximum output power proportion of each DC/DC converter and the total current existing after power limiting of the photovoltaic system. In this way, not only appropriate load distribution can be implemented based on a current actual output capability of each DC/DC converter, but also balanced distribution of output powers of the DC/DC converters is implemented. Therefore, service lives of the DC/DC converters are prolonged, and operation and maintenance costs of the photovoltaic system are reduced. It may also be ensured that after each DC/DC converter performs feedback adjustment on the respective output current value based on the respective reference output current value, the output power of the photovoltaic system is less than the system output power threshold.

In another embodiment, the current output state parameter of the DC/DC converter in each power supply unit includes a current maximum output power and a current output current of the DC/DC converter in each power supply unit.

The DC/AC converter may calculate, based on the current maximum output power of each DC/DC converter connected in parallel to the direct current bus, a current maximum output power proportion that is of the current maximum output power of each DC/DC converter and that is in a sum of current maximum output powers of the at least two DC/DC converters.

Further, the current output state parameter of the DC/DC converter in each power supply unit further includes a current device working condition parameter of the DC/DC converter in each power supply unit.

The DC/AC converter may further determine, based on the current device working condition parameter and the current maximum output power of each DC/DC converter, a current corrected output power of each DC/DC converter, determine, based on the current corrected output power of each DC/DC converter, a current corrected output power proportion that is of the current corrected output power of each DC/DC converter and that is in a sum of current corrected output powers of at least two DC/DC converters, and determine the current corrected output power proportion of each DC/DC converter as the current maximum output power proportion of each DC/DC converter.

Then, the DC/AC converter determines a product of a sum of current output currents of the DC/DC converters and the current maximum output power proportion of each DC/DC converter as the reference output current value of each DC/DC converter.

In still another embodiment, the current output state parameter of the DC/DC converter in each power supply unit includes a current output power and a current output capability of the DC/DC converter in each power supply unit.

The current output capability of the DC/DC converter in the power supply unit includes a maximum output power currently allowed by the DC/DC converter in the power supply unit, that is, a current maximum output power of the DC/DC converter.

The DC/AC converter may calculate, based on the current maximum output power of each DC/DC converter, a current maximum output power proportion that is of the current maximum output power of each DC/DC converter and that is in a sum of current maximum output powers of the at least two DC/DC converters.

Further, the current output capability of the DC/DC converter in each power supply unit further includes a current device working condition parameter of the DC/DC converter in each power supply unit.

The DC/AC converter may further determine, based on the current device working condition parameter and the current maximum output power of each DC/DC converter, a current corrected output power of each DC/DC converter, determine, based on the current corrected output power of each DC/DC converter, a current corrected output power proportion that is of the current corrected output power of each DC/DC converter and that is in a sum of current corrected output powers of at least two DC/DC converters, and determine the current corrected output power proportion of each DC/DC converter as the current maximum output power proportion of each DC/DC converter.

Then, the DC/AC converter determines a product of a sum of current output currents of the DC/DC converters and the current maximum output power proportion of each DC/DC converter as the reference output current value of each DC/DC converter.

It may be understood that, in this embodiment, the DC/AC converter may appropriately distribute the current output power of each DC/DC converter based on the current actual output capability of each DC/DC converter, to implement output power balance between the DC/DC converters, and prevent one or some of the DC/DC converters from working in a limit power supply state (that is, the DC/DC converter works at an output power exceeding a maximum output power that the DC/DC converter can currently bear). Therefore, service lives of the DC/DC converters are prolonged, and operation and maintenance costs of the photovoltaic system are reduced.

Then, the DC/AC converter adjusts the current output power of each DC/DC converter based on the reference output current value of each DC/DC converter, to enable the current output power of each DC/DC converter to be a reference output power of each DC/DC converter. The reference output power of the DC/DC converter is a product of the reference output current of the DC/DC converter and the direct current bus voltage. There are same output voltages (that is, the direct current bus voltage) between the DC/DC converters connected in parallel to the direct current bus and the direct current bus. Therefore, when the current output power of each DC/DC converter is adjusted to the reference output power of each DC/DC converter, only an output current value between each DC/DC converter and the direct current bus needs to be adjusted to the reference output current value of each DC/DC converter. Herein, for an embodiment in which the DC/AC converter adjusts the current output power of each DC/DC converter based on the reference output current value of each DC/DC converter, refer to the corresponding description in the embodiment using the example in which $n_2$ is an integer greater than or equal to 2. Details are not described herein again.

In this application, when the output power of the photovoltaic system is greater than the system output power threshold, the DC/AC converter may distribute the output current value of each DC/DC converter based on a current actual output capability of each DC/DC converter connected in parallel to the direct current bus, to implement appropriate load distribution between the DC/DC converters (that is, implement output power balance between the DC/DC converters), and prevent one or some of the DC/DC converters from working in a limit power supply state. Therefore, service lives of the DC/DC converters are prolonged, and operation and maintenance costs of the photovoltaic system are reduced. In addition, when the output power of the photovoltaic system is less than or equal to the system output power threshold, the DC/AC converter no longer performs load balancing between the DC/DC converters, and each DC/DC converter determines an initial bus reference voltage of each DC/DC converter as a target bus reference voltage of each DC/DC converter, and adjusts an output current value between each DC/DC converter and the direct current bus based on the respective target bus reference voltage of each DC/DC converter, so that each DC/DC converter outputs at a current maximum output power, to improve a power supplying capacity of the photovoltaic system.

With reference to the photovoltaic system (when $n_2$ is an integer greater than or equal to 2) in FIG. 1, the following describes an embodiment of a power supply current control method of the photovoltaic system.

Figure 6:
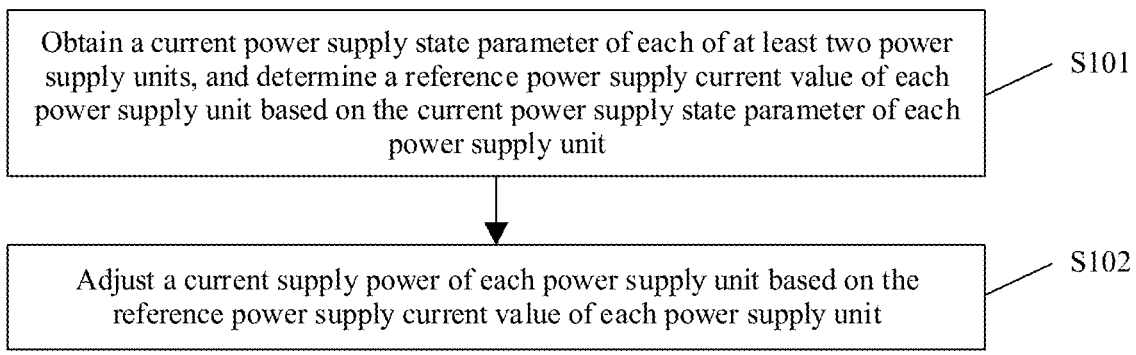
FIG. 6 is a schematic flowchart of a power supply current control method of a photovoltaic system according to this application.

FIG. 6 is a schematic flowchart of a power supply current control method of a photovoltaic system according to this application. The power supply current control method of a photovoltaic system provided in this embodiment of this application may include the following operations:

S101: Obtain a current power supply state parameter of each of the at least two power supply units, and determine a reference power supply current value of each power supply unit based on the current power supply state parameter of each power supply unit.

In an embodiment, when a current output power of the photovoltaic system is greater than a system output power threshold, a power supply current control apparatus sends a power supply parameter obtain instruction to the power supply units (corresponding to the power supply unit 111, . . . , and the power supply unit $11n_1$ in FIG. 1, and the power supply unit 121, . . . , and the power supply unit $12n_2$ in FIG. 1) connected in parallel to the direct current bus BUS. Each power supply unit sends the current power supply state parameter of the power supply unit to the power supply current control apparatus according to the received power supply parameter obtain instruction.

In an embodiment, the current power supply state parameter of each power supply unit includes a current maximum supply power of each power supply unit.

The power supply current control apparatus may obtain the system output power threshold and a direct current bus voltage, determine a quotient of the system output power threshold and the direct current bus voltage as a total current existing after power limiting of the photovoltaic system, and determine a product of the total current existing after power limiting of the photovoltaic system and a current maximum supply power proportion of each power supply unit as the reference power supply current value of each power supply unit.

In another embodiment, the current power supply state parameter of each power supply unit includes a current maximum supply power and a current power supply current of each power supply unit.

The power supply current control apparatus may determine a product of a sum of current power supply currents of the power supply units and the current maximum supply power proportion of each power supply unit as the reference power supply current value of each power supply unit.

In still another embodiment, the current power supply state parameter of each power supply unit includes a current supply power and a current power supply capability of each power supply unit.

The current power supply capability of the power supply unit includes a maximum supply power currently allowed by the power supply unit, that is, a current maximum supply power.

The power supply current control apparatus may calculate, based on the current maximum supply power of each power supply unit, a current maximum supply power proportion that is of the current maximum supply power of each power supply unit and that is in a sum of current maximum supply powers of the at least two power supply units.

In the foregoing embodiments, the power supply current control apparatus may determine the current maximum supply power proportion of each power supply unit directly based on the current maximum supply power of each power supply unit, or the power supply current control apparatus may correct the current maximum supply power of each power supply unit based on the current device working condition parameter of each power supply unit when the current power supply state parameter of each power supply unit further includes the current device working condition parameter of each power supply unit or when the current power supply capability of each power supply unit further includes the current device working condition parameter of each power supply unit, and determine the current maximum supply power proportion of each power supply unit based on a current corrected supply power proportion of each power supply unit. The current device working condition parameter includes at least one of a current device temperature, a current device current stress, or a current device voltage stress.

It may be understood that the current maximum supply power of the power supply unit is corrected based on the current device working condition parameter of the power supply unit, so that at least one of the following cases can be avoided: an excessively high device temperature, an excessively high device current stress, or an excessively high device voltage stress, and service lives of the power supply units are prolonged.

S102: Adjust a current supply power of each power supply unit based on the reference power supply current value of each power supply unit.

In some embodiments, the power supply current control apparatus sends a supply power correct instruction to each power supply unit, and the power supply unit adjusts, according to the received supply power correct instruction, a power supply current value between the power supply unit and the direct current bus to the reference power supply current value of the power supply unit, to enable a current supply power of the power supply unit to be a reference supply power of the power supply unit.

In an embodiment, the supply power correct instruction includes a reference power supply current value of the power supply unit.

In another embodiment, the supply power correct instruction includes a control correction value of the power supply unit.

Before the power supply current control apparatus sends the supply power correct instruction to each power supply unit, the power supply current control apparatus may separately use a difference between the reference power supply current value and a current power supply current value of each power supply unit as an input parameter of a PI control algorithm, determine a control correction value of each power supply unit, and send the supply power correct instruction to each power supply unit.

In another embodiment, the supply power correct instruction includes a target bus reference voltage of the power supply unit.

Before the power supply current control apparatus sends the supply power correct instruction to each power supply unit, the power supply current control apparatus may use a difference between the reference power supply current value of each power supply unit and a current power supply current value as an input parameter of the PI control algorithm, determine a control correction value of each power supply unit, and determine a sum of the control correction value and an initial bus reference voltage that are of each power supply unit as a target bus reference voltage of each power supply unit. Further, the power supply current control apparatus may further determine a virtual impedance value corresponding to the current power supply current of each power supply unit as a virtual impedance value of each power supply unit, determine a product of the power supply current of each power supply unit and the virtual impedance value as a voltage correction value of each power supply unit, determine a sum of the voltage correction value, the control correction value, and the initial bus reference voltage of each power supply unit as the target bus reference voltage of each power supply unit, and send the power supply power correct instruction including the target bus reference voltage to each power supply unit.

It may be understood that the supply power correct instruction provided in this application may include any one of the reference power supply current value, the control correction value, and the target bus reference voltage of the power supply unit, so that applicability of the power supply current control method can be improved.

It should be noted that in this embodiment of this application, the power supply current control apparatus may be a device that is in the photovoltaic system and that is independent of each power supply unit, or may be a DC/DC converter or a DC/AC converter included in any one of the power supply units connected in parallel to the direct current bus.

In this embodiment of this application, when the output power of the photovoltaic system is greater than the system output power threshold, the power supply current control apparatus may distribute the power supply current value of each power supply unit based on the current actual power supply capability of each power supply unit connected in parallel to the direct current bus (that is, implement supply power balance between the power supply units), to prevent one or some of the power supply units from working in a limit power supply state, so as to implement appropriate load distribution between the power supply units. Further, service lives of the power supply units are prolonged and operation and maintenance costs of the photovoltaic system are reduced.

With reference to the photovoltaic system (when $n_2=1$) in FIG. 1, the following describes an embodiment of the power supply current control method of the photovoltaic system.

Figure 7:
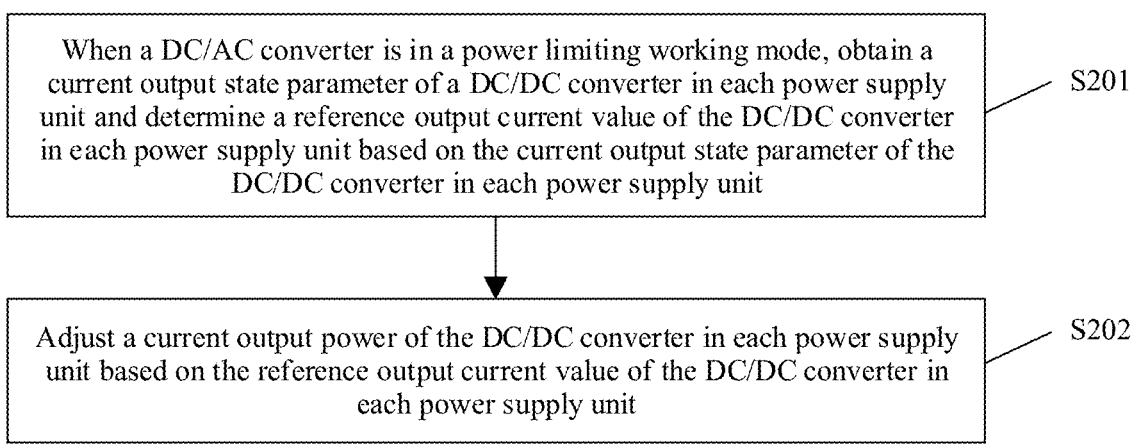
FIG. 7 is another schematic flowchart of a power supply current control method of a photovoltaic system according to this application.

FIG. 7 is another schematic flowchart of a power supply current control method of a photovoltaic system according to this application. The power supply current control method of a photovoltaic system provided in this embodiment of this application may include the following operations:

S201: When the DC/AC converter is in a power limiting working mode, obtain a current output state parameter of the DC/DC converter in each power supply unit and determine a reference output current value of the DC/DC converter in each power supply unit based on the current output state parameter of the DC/DC converter in each power supply unit.

In an embodiment, when a current output power of the photovoltaic system is greater than a system output power threshold, the DC/AC converter sends an output parameter obtain instruction to the DC/DC converters in the power supply unit 111, . . . , and the power supply unit $11n_1$ connected in parallel to the direct current bus BUS. The DC/DC converters in the power supply unit 111, . . . , and the power supply unit $11n_1$ send respective current output state parameters to the DC/AC converter according to the received output parameter obtain instruction.

In an embodiment, the current output state parameter of the DC/DC converter in each power supply unit includes a current maximum output power of the DC/DC converter in each power supply unit.

The DC/AC converter may obtain the system output power threshold and a direct current bus voltage, determine a quotient of the system output power threshold and the direct current bus voltage as a total current existing after power limiting of the photovoltaic system, and determine a product of the total current existing after power limiting of the photovoltaic system and the current maximum output power proportion of each DC/DC converter as the reference output current value of each DC/DC converter.

In another embodiment, the current output state parameter of the DC/DC converter in each power supply unit includes a current maximum output power and a current output current of the DC/DC converter in each power supply unit.

Then, the DC/AC converter determines a product of a sum of current output currents of the DC/DC converters and the current maximum output power proportion of each DC/DC converter as the reference output current value of each DC/DC converter.

In still another embodiment, the current output state parameter of the DC/DC converter in each power supply unit includes a current output power and a current output capability of the DC/DC converter in each power supply unit.

The current output capability of the DC/DC converter in the power supply unit includes a maximum output power currently allowed by the DC/DC converter in the power supply unit, that is, a current maximum output power of the DC/DC converter.

The DC/AC converter may calculate, based on the current maximum output power of each DC/DC converter, a current maximum output power proportion that is of the current maximum output power of each DC/DC converter and that is in a sum of current maximum output powers of the at least two DC/DC converters.

In the foregoing embodiments, the DC/AC converter may directly determine the current maximum output power proportion of each DC/DC converter based on the current maximum output power of each DC/DC converter, or the DC/AC converter may correct the current maximum output power of each DC/DC converter based on the current device working condition parameter of each DC/DC converter when the current output state parameter of each DC/DC converter further includes the current device working condition parameter of each DC/DC converter or the current output capability of each DC/DC converter further includes the current device working condition parameter of each DC/DC converter, and determine the current maximum output power proportion of each DC/DC converter based on a current corrected output power proportion of each DC/DC converter. The current device working condition parameter includes at least one of a current device temperature, a current device current stress, or a current device voltage stress.

It may be understood that the current maximum output power of the DC/DC converter is corrected based on the current device working condition parameter of the DC/DC converter, so that at least one of the following cases can be avoided: an excessively high device temperature, an excessively high device current stress, or an excessively high device voltage stress, and service lives of the DC/DC converters are prolonged.

S202: Adjust a current output power of the DC/DC converter in each power supply unit based on the reference output current value of the DC/DC converter in each power supply unit.

In some embodiments, the DC/AC converter sends an output power correct instruction to each DC/DC converter, and the DC/DC converter adjusts, according to the received output power correct instruction, an output current value between the DC/DC converter and the direct current bus to the reference output current value of the DC/DC converter, to enable the current output power of the DC/DC converter to be a reference output power of the DC/DC converter.

In an embodiment, the output power correct instruction includes a reference output current value of the DC/DC converter.

In another embodiment, the output power correct instruction includes a control correction value of the DC/DC converter.

Before the DC/AC converter sends the output power correct instruction to each DC/DC converter, the DC/AC converter may use a difference between the reference output current value and the current output current value of each DC/DC converter as an input parameter of the PI control algorithm, determine the control correction value of each DC/DC converter, and send the output power correct instruction to each DC/DC converter.

In still another embodiment, the output power correct instruction includes a target bus reference voltage of the DC/DC converter.

Before the DC/AC converter sends the output power correct instruction to each DC/DC converter, the DC/AC converter may use a difference between the reference output current value and the current output current value of each DC/DC converter as an input parameter of the PI control algorithm, determine a control correction value of each DC/DC converter, and determine a sum of the control correction value and an initial bus reference voltage that are of each DC/DC converter as a target bus reference voltage of each DC/DC converter. Further, the DC/AC converter may further determine a virtual impedance value corresponding to the current output current of each DC/DC converter as a virtual impedance value of each DC/DC converter, determine a product of the current output current and the virtual impedance value of each DC/DC converter as a voltage correction value of each DC/DC converter, determine a sum of the voltage correction value, the control correction value, and the initial bus reference voltage of each DC/DC converter as the target bus reference voltage of each DC/DC converter, and send the output power correct instruction including the target bus reference voltage to each DC/DC converter.

It may be understood that the output power correct instruction provided in this application may include any one of the reference power supply current value, the control correction value, and the target bus reference voltage of the DC/DC converter, so that applicability of the power supply current control method can be improved.

In this embodiment of this application, when the output power of the photovoltaic system is greater than the system output power threshold, the DC/AC converter may distribute the output current value of each DC/DC converter based on the current actual output capability of each DC/DC converter connected in parallel to the direct current bus (that is, implement output power balance between the DC/DC converters), to prevent one or some of the DC/DC converters from working in a limit power supply state, and implement appropriate load distribution between the DC/DC converters. Therefore, service lives of the DC/DC converters are prolonged, operation and maintenance costs of the photovoltaic system are reduced.

With reference to the photovoltaic system (when $n_2$ is an integer greater than or equal to 2) shown in FIG. 1, the following describes a power supply current control apparatus of a photovoltaic system.

Figure 8:
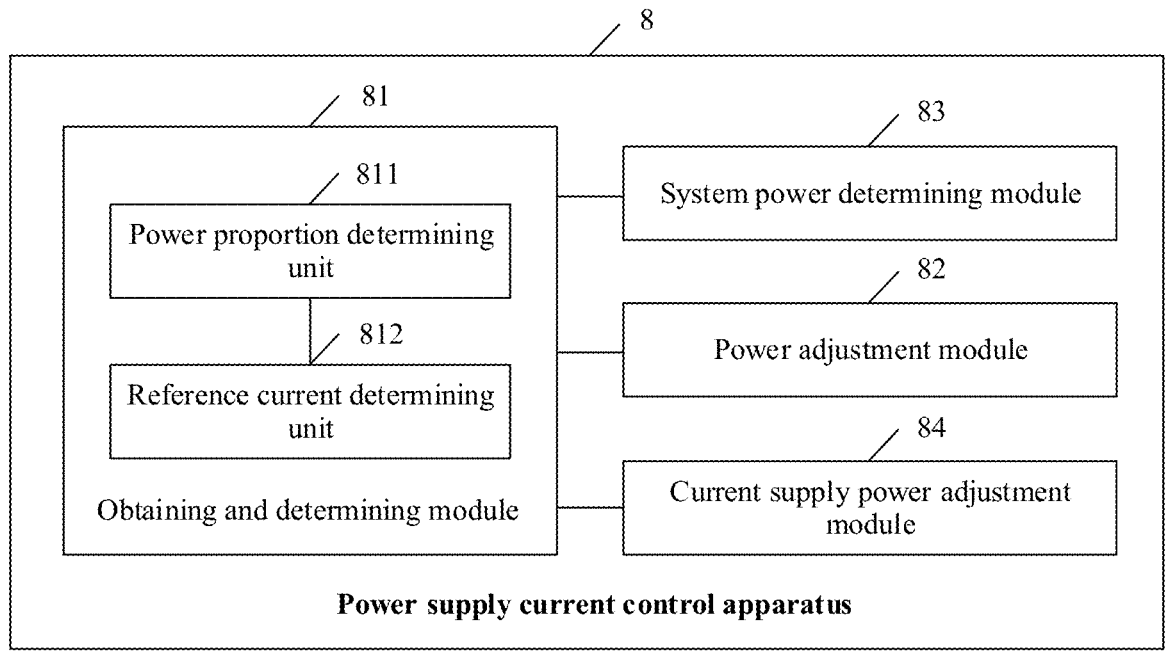
FIG. 8 is a schematic diagram of a structure of a power supply current control apparatus of a photovoltaic system according to this application.

FIG. 8 is a schematic diagram of a structure of a power supply current control apparatus of a photovoltaic system according to this application. As shown in FIG. 8, the power supply current control apparatus 8 may include an obtaining and determining module 81 and a power adjustment module 82.

The obtaining and determining module 81 is configured to obtain a current power supply state parameter of each of the at least two power supply units, and determine a reference power supply current value of each power supply unit based on the current power supply state parameter of each power supply unit.

The power adjustment module 82 is configured to adjust a current supply power of each power supply unit based on the reference power supply current value of each power supply unit.

In some embodiments, the power supply current control apparatus further includes: a system power determining module 83, configured to determine that a current output power of the photovoltaic system is greater than a system output power threshold.

In some embodiments, the current power supply state parameter of each power supply unit includes a current supply power and a current power supply capability of each power supply unit.

The foregoing power supply current control apparatus further includes:
  a current supply power adjustment module 84, configured to adjust the current supply power of each power supply unit based on the current supply power and the current power supply capability of each power supply unit, to prevent one or some of the at least two power supply units from working in a limit working state.

In some embodiments, the current power supply state parameter of each power supply unit includes a current maximum supply power of each power supply unit.

The obtaining and determining module 81 includes:
  a power proportion determining unit 811, configured to determine, based on the current maximum supply power of each power supply unit, a current maximum supply power proportion that is of the current maximum supply power of each power supply unit and that is in a sum of current maximum supply powers of the at least two power supply units; and
  a reference current determining unit 812, configured to determine the reference power supply current value of each power supply unit based on the current maximum supply power proportion.

In some embodiments, the current power supply state parameter of each power supply unit further includes a current device working condition parameter of each power supply unit.

The power proportion determining unit 811 is configured to: determine a current corrected supply power of each power supply unit based on the current device working condition parameter and the current maximum supply power of each power supply unit;
  determine, based on the current corrected supply power of each power supply unit, a current corrected supply power proportion that is of the current corrected supply power of each power supply unit and that is in a sum of current corrected supply powers of the at least two power supply units; and
  determine the current corrected supply power proportion as the current maximum supply power proportion.

In some embodiments, the power proportion determining unit 811 is configured to: obtain a power attenuation coefficient corresponding to the current device working condition parameter of each power supply unit, and determine the current corrected supply power of each power supply unit based on the current maximum supply power and the power attenuation coefficient of each power supply unit.

In some embodiments, the current device working condition parameter includes at least one of a current device temperature, a current device current stress, or a current device voltage stress.

In some embodiments, the current power supply state parameter of each power supply unit further includes a current power supply current of each power supply unit.

The reference current determining unit 812 is configured to determine the reference power supply current value of each power supply unit based on the current maximum supply power proportion and a sum of current power supply currents of the at least two power supply units.

In some embodiments, the power adjustment module 82 is configured to send a supply power correct instruction to each power supply unit, to enable each power supply unit to adjust the current supply power of each power supply unit to a reference supply power of each power supply unit based on the reference power supply current value of each power supply unit included in the supply power correct instruction, where the reference supply power of each power supply unit is determined based on the reference power supply current value of each power supply unit.

In some embodiments, the power adjustment module 82 is configured to: determine a control correction value of each power supply unit based on the reference power supply current value and the current power supply state parameter of each power supply unit; and
  send a supply power correct instruction to each power supply unit, to enable each power supply unit to adjust the current supply power of each power supply unit to a reference supply power of each power supply unit based on the control correction value of each power supply unit included in the supply power correct instruction, where the reference supply power of each power supply unit is determined based on the reference power supply current value of each power supply unit.

In some embodiments, the power adjustment module 82 is configured to: determine a control correction value of each power supply unit based on the reference power supply current value and the current power supply state parameter of each power supply unit;
  determine a target bus reference voltage of each power supply unit based on an initial bus reference voltage and the control correction value of each power supply unit; and
  send a supply power correct instruction to each power supply unit, to enable each power supply unit to adjust the current supply power of each power supply unit to a reference supply power of each power supply unit based on the target bus reference voltage of each power supply unit included in the supply power correct instruction, where the reference supply power of each power supply unit is determined based on the reference power supply current value of each power supply unit.

In some embodiments, the power adjustment module 82 is configured to determine the target bus reference voltage of each power supply unit based on the initial bus reference voltage, the control correction value of each power supply unit, and a voltage correction value of each power supply unit, where the voltage correction value of each power supply unit is determined based on the current power supply state parameter of each power supply unit and a virtual impedance of each power supply unit.

In some embodiments, the virtual impedance is determined based on the current power supply state parameter of the power supply unit.

In some embodiments, the power supply current control apparatus is a first power supply unit in the at least two power supply units.

In some embodiments, the power supply unit includes a DC/DC converter or a DC/AC converter, and the DC/DC converter is configured to adjust a current supply power of the DC/DC converter, and the DC/AC converter is configured to adjust a current supply power of the DC/AC converter.

It may be understood that the power supply current control apparatus 8 is configured to implement the operations performed by the power supply current control apparatus in the embodiment shown in FIG. 6.

In this application, when the output power of the photovoltaic system is greater than the system output power threshold, the power supply current control apparatus 8 may distribute a power supply current value of each power supply unit based on a current actual power supply capability of each power supply unit connected in parallel to the direct current bus, to implement appropriate load distribution between the power supply units. Further, service lives of the power supply units are prolonged and operation and maintenance costs of the photovoltaic system are reduced.

The following describes a DC/AC converter of the photovoltaic system with reference to the photovoltaic system (when $n_2=1$) shown in FIG. 1.

Figure 9:
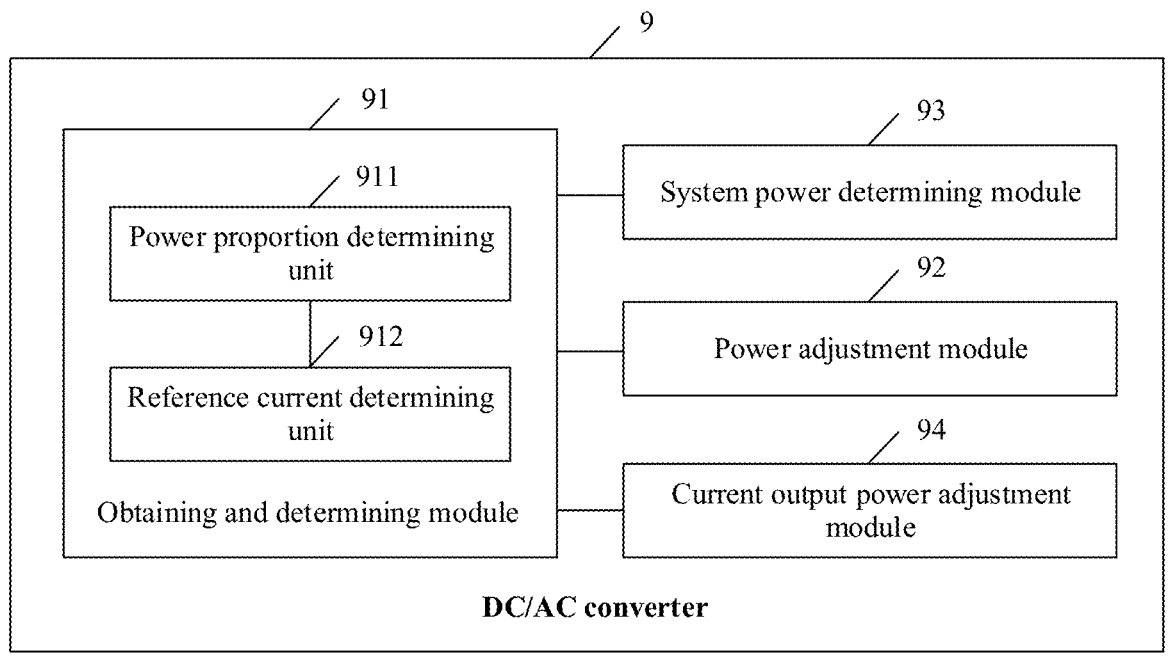
FIG. 9 is a schematic diagram of a structure of a DC/AC converter in a photovoltaic system according to this application.

FIG. 9 is a schematic diagram of a structure of a DC/AC converter in a photovoltaic system according to this application. As shown in FIG. 9, the DC/AC converter 9 may include an obtaining and determining module 91 and a power adjustment module 92.

The obtaining and determining module 91 is configured to: when the DC/AC converter is in a power limiting working mode, obtain a current output state parameter of the DC/DC converter in each power supply unit and determine a reference output current value of the DC/DC converter in each power supply unit based on the current output state parameter of the DC/DC converter in each power supply unit.

The power adjustment module 92 is configured to adjust a current output power of the DC/DC converter in each power supply unit based on the reference output current value of the DC/DC converter in each power supply unit.

In some embodiments, the DC/AC converter 9 further includes:
  a system power determining module 93, configured to determine that a current output power of the photovoltaic system is greater than a system output power threshold.

In some embodiments, the current output state parameter of the DC/DC converter in each power supply unit includes a current output power and a current output capability of the DC/DC converter in each power supply unit.

The DC/AC converter 9 further includes:
  a current output power adjustment module 94, configured to adjust the current output power of the DC/DC converter in each power supply unit based on the current output power and the current output capability of the DC/DC converter in each power supply unit, to prevent one or some of the DC/DC converters in the photovoltaic system from working in a limit working state.

In some embodiments, the current output state parameter of the DC/DC converter in each power supply unit includes a current maximum output power of the DC/DC converter in each power supply unit.

The obtaining and determining module 91 includes:
a power proportion determining unit 911, configured to determine, based on the current maximum output power of the DC/DC converter in each power supply unit, a current maximum output power proportion that is of the current maximum output power of the DC/DC converter in each power supply unit and that is in a sum of current maximum output powers of the DC/DC converters in the at least two power supply units; and
a reference current determining unit 912, configured to determine the reference output current value of the DC/DC converter in each power supply unit based on the current maximum output power proportion.

In some embodiments, the current output state parameter of the DC/DC converter in each power supply unit further includes a current device working condition parameter of the DC/DC converter in each power supply unit.

The power proportion determining unit 911 is configured to: determine, based on the current device working condition parameter and the current maximum output power of the DC/DC converter in each power supply unit, a current corrected output power of the DC/DC converter in each power supply unit;
determine, based on the current corrected output power of the DC/DC converter in each power supply unit, a current corrected output power proportion that is of the current corrected output power of the DC/DC converter in each power supply unit and that is in a sum of current corrected output powers of the DC/DC converters in the at least two power supply units; and
determine the current corrected output power proportion as the current maximum output power proportion.

In some embodiments, the power proportion determining unit 911 is configured to obtain a power attenuation coefficient corresponding to the current device working condition parameter of the DC/DC converter in each power supply unit, and determine the current corrected output power of the DC/DC converter in each power supply unit based on the current maximum output power and the power attenuation coefficient of the DC/DC converter in each power supply unit.

In some embodiments, the current device working condition parameter includes at least one of a current device temperature, a current device current stress, or a current device voltage stress.

In some embodiments, the current output state parameter of the DC/DC converter in each power supply unit further includes a current output current of the DC/DC converter in each power supply unit.

The reference current determining unit 912 is configured to determine the reference output current value of the DC/DC converter in each power supply unit based on the current maximum output power proportion and a sum of current output currents of the DC/DC converters in the at least two power supply units.

It may be understood that the DC/AC converter 9 is configured to implement operations performed by the DC/AC converter in the embodiment shown in FIG. 7.

In this embodiment of this application, when the output power of the photovoltaic system is greater than the system output power threshold, the DC/AC converter may distribute an output current value of each DC/DC converter based on a current actual output capability of each DC/DC converter connected in parallel to the direct current bus, to implement appropriate load distribution between the DC/DC converters (that is, implement output power balance between the DC/DC converters), and prevent one or some of the DC/DC converters from working in a limit power supply state. Therefore, service lives of the DC/DC converters are prolonged, operation and maintenance costs of the photovoltaic system are reduced.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A photovoltaic system, comprising:
a direct current (DC) bus;
at least two power supply units connected in parallel to the direct current bus, wherein each of the at least two power supply units comprises a DC/DC converter comprising an input end connected to a direct current power source;
a DC/AC converter connected to the at least two power supply units through the direct current bus, wherein, when the DC/AC converter is in a power limiting working mode, the DC/AC converter is configured to:
obtain a current output state parameter of the DC/DC converter in each of the at least two power supply units comprising a current maximum output power of the DC/DC converter in each of the at least two power supply units;
determine, based on the current maximum output power of the DC/DC converter in each of the at least two power supply units, a current maximum output power proportion that is of the current maximum output power of the DC/DC converter in each of the at least two power supply units and that is in a sum of current maximum output powers of the DC/DC converters in the at least two power supply units;
determine a reference output current value of the DC/DC converter in each of the at least two power supply units based on the current maximum output power proportion; and
adjust a current output power of the DC/DC converter in each of the at least two power supply units based on the reference output current value of the DC/DC converter in each of the at least two power supply units to prevent at least one of the DC/DC converters from working in a limit working state.

2. The photovoltaic system according to claim 1, wherein the DC/AC converter is further configured to determine that a current output power of the photovoltaic system is greater than a system output power threshold.

3. The photovoltaic system according to claim 1, wherein
the current output state parameter of the DC/DC converter in each of the at least two power supply units comprises the current output power and a current output capability of the DC/DC converter in each of the at least two power supply units; and
the DC/AC converter is further configured to adjust the current output power of the DC/DC converter in each of the at least two power supply units based on the current output power and the current output capability of the DC/DC converter in each of the at least two power supply units to prevent the at least one of the DC/DC converters from working in the limit working state.

4. The photovoltaic system according to claim 1, wherein the current output state parameter of the DC/DC converter in each of the at least two power supply units further comprises a current device working condition parameter of the DC/DC converter in each of the at least two power supply units; and
the DC/AC converter is further configured to:
  determine, based on the current device working condition parameter and the current maximum output power of the DC/DC converter in each of the at least two power supply units, a current corrected output power of the DC/DC converter in each of the at least two power supply units;
  determine, based on the current corrected output power of the DC/DC converter in each of the at least two power supply units, a current corrected output power proportion that is of the current corrected output power of the DC/DC converter in each of the at least two power supply units and that is in the sum of current corrected output powers of the DC/DC converters in the at least two power supply units; and
  determine the current corrected output power proportion as the current maximum output power proportion.

5. The photovoltaic system according to claim 4, wherein the DC/AC converter is further configured to:
  obtain a power attenuation coefficient corresponding to the current device working condition parameter of the DC/DC converter in each of the at least two power supply units, and
  determine the current corrected output power of the DC/DC converter in each of the at least two power supply units based on the current maximum output power and the power attenuation coefficient of the DC/DC converter in each of the at least two power supply units.

6. The photovoltaic system according to claim 4, wherein the current device working condition parameter comprises at least one of a current device temperature, a current device current stress, or a current device voltage stress.

7. The photovoltaic system according to claim 1, wherein the current output state parameter of the DC/DC converter in each of the at least two power supply units further comprises a current output current of the DC/DC converter in each of the at least two power supply units; and
the DC/AC converter is further configured to determine the reference output current value of the DC/DC converter in each of the at least two power supply units based on the current maximum output power proportion and the sum of current output currents of the DC/DC converters in the at least two power supply units.

8. A photovoltaic system, comprising:
a direct current bus;
at least two power supply units connected in parallel to the direct current bus;
a system control unit that establishes a communication connection to the at least two power supply units, wherein the system control unit is configured to:
  obtain a current power supply state parameter of each of the at least two power supply units comprising a current maximum output power of a DC/DC converter in each of the at least two power supply units;
  determine, based on the current maximum output power of the DC/DC converter in each of the at least two power supply units, a current maximum output power proportion that is of the current maximum output power of the DC/DC converter in each of the at least two power supply units and that is in a sum of current maximum output powers of the DC/DC converters in the at least two power supply units;
  determine a reference power supply current value of each of the at least two power supply units based on the current maximum output power proportion; and
  adjust a current supply power of each of the at least two power supply units based on the reference power supply current value of each of the at least two power supply units to prevent at least one of the at least two power supply units from working in a limit working state.

9. The photovoltaic system according to claim 8, wherein the system control unit is configured to:
  determine that a current output power of the photovoltaic system is greater than a system output power threshold.

10. The photovoltaic system according to claim 8, wherein
the current power supply state parameter of each of the at least two power supply units comprises a current supply power and a current power supply capability of each of the at least two power supply units; and
the system control unit is further configured to adjust the current supply power of each of the at least two power supply units based on the current supply power and the current power supply capability of each of the at least two power supply units to prevent at least one of the at least two power supply units from working in the limit working state.

11. The photovoltaic system according to claim 8, wherein the system control unit is further configured to:
  send a supply power correct instruction to each of the at least two power supply units to enable each of the at least two power supply units to adjust the current supply power of each of the at least two power supply units to a reference supply power of each of the at least two power supply units based on the reference power supply current value of each of the at least two power supply units comprised in the supply power correct instruction, wherein the reference supply power of each of the at least two power supply units is determined based on the reference power supply current value of each of the at least two power supply units.

12. The photovoltaic system according to claim 8, wherein the system control unit is further configured to:
  determine a control correction value of each of the at least two power supply units based on the reference power supply current value and the current power supply state parameter of each of the at least two power supply units; and
  send a supply power correct instruction to each of the at least two power supply units, to enable each of the at least two power supply units to adjust the current supply power of each of the at least two power supply units to a reference supply power of each of the at least two power supply units based on the control correction value comprised in the supply power correct instruction, wherein the reference supply power of each of the at least two power supply units is determined based on the reference power supply current value of each of the at least two power supply units.

13. The photovoltaic system according to claim 8, wherein the system control unit is further configured to:
  determine a control correction value of each of the at least two power supply units based on the reference power supply current value and the current power supply state parameter of each of the at least two power supply units;

determine a target bus reference voltage of each of the at least two power supply units based on an initial bus reference voltage and the control correction value of each of the at least two power supply units; and send a supply power correct instruction to each of the at least two power supply units to enable each of the at least two power supply units to adjust the current supply power of each of the at least two power supply units to a reference supply power of each of the at least two power supply units based on the target bus reference voltage of each of the at least two power supply units comprised in the supply power correct instruction, wherein the reference supply power of each of the at least two power supply units is determined based on the reference power supply current value of each of the at least two power supply units.

14. The photovoltaic system according to claim 13, wherein the system control unit is further configured to:

determine the target bus reference voltage of each of the at least two power supply units based on the initial bus reference voltage, the control correction value of each of the at least two power supply units, and a voltage correction value of each of the at least two power supply units, wherein the voltage correction value of each of the at least two power supply units is determined based on the current power supply state parameter of each of the at least two power supply units and a virtual impedance of each of the at least two power supply units.

15. The photovoltaic system according to claim 8, wherein a first power supply unit in the at least two power supply units comprises the system control unit.

16. The photovoltaic system according to claim 8, wherein at least one of the at least two power supply units comprises a DC/DC converter or a DC/AC converter, wherein the DC/DC converter is configured to adjust a current supply power of the DC/DC converter, and wherein the DC/AC converter is configured to adjust a current supply power of the DC/AC converter.

17. A power supply current control method of a photovoltaic system, wherein the photovoltaic system comprises a direct current (DC) bus, at least two power supply units connected in parallel to the direct current bus, and a DC/AC converter connected to the at least two power supply units based on the direct current bus, each of the at least two power supply units comprises a DC/DC converter, and an input end of the DC/DC converter is connected to a direct current power source, the method comprising:

when the DC/AC converter is in a power limiting working mode, obtaining, by the DC/AC converter, a current output state parameter of the DC/DC converter in each of the at least two power supply units comprising a current maximum output power of the DC/DC converter in each of the at least two power supply units;

determining, based on the current maximum output power of the DC/DC converter in each of the at least two power supply units, a current maximum output power proportion that is of the current maximum output power of the DC/DC converter in each of the at least two power supply units and that is in a sum of current maximum output powers of the DC/DC converters in the at least two power supply units;

determining a reference output current value of the DC/DC converter in each of the at least two power supply units based on the current maximum output power proportion; and adjusting a current output power of the DC/DC converter in each of the at least two power supply units based on the reference output current value of the DC/DC converter in each of the at least two power supply units to prevent at least one of the DC/DC converters from working in a limit working state.

18. The method according to claim 17, wherein the current output state parameter of the DC/DC converter in each of the at least two power supply units comprises the current output power and a current output capability of the DC/DC converter in each of the at least two power supply units, and wherein the method further comprises:

adjusting, by the DC/AC converter, the current output power of the DC/DC converter in each of the at least two power supply units based on the current output power and the current output capability of the DC/DC converter in each of the at least two power supply units, to prevent the at least one of the DC/DC converters from working in the limit working state.

* * * * *